United States Patent
Ollweiler et al.

(10) Patent No.: US 9,835,294 B2
(45) Date of Patent: Dec. 5, 2017

(54) DUAL PRESSURE-RETAINING MANWAY SYSTEM

(71) Applicants: Mark J. Ollweiler, Lakewood, CO (US); Ivan Keith Hall, Beach City, TX (US); Luis Esteban Hernandez, Mission, TX (US)

(72) Inventors: Mark J. Ollweiler, Lakewood, CO (US); Ivan Keith Hall, Beach City, TX (US); Luis Esteban Hernandez, Mission, TX (US)

(73) Assignee: Trinity Tank Car, Inc., Dallas, TX (US)

( * ) Notice: Subject to any disclaimer, the term of this patent is extended or adjusted under 35 U.S.C. 154(b) by 185 days.

(21) Appl. No.: 14/676,353

(22) Filed: Apr. 1, 2015

(65) Prior Publication Data

US 2015/0276133 A1    Oct. 1, 2015

Related U.S. Application Data

(63) Continuation of application No. PCT/US2015/023622, filed on Mar. 31, 2015.

(Continued)

(51) Int. Cl.
*F17C 1/00* (2006.01)
*F17C 13/00* (2006.01)

(52) U.S. Cl.
CPC ...... *F17C 13/00* (2013.01); *F17C 2201/0104* (2013.01); *F17C 2201/035* (2013.01); *F17C 2201/052* (2013.01); *F17C 2201/054* (2013.01); *F17C 2203/035* (2013.01); *F17C 2203/0391* (2013.01); *F17C 2203/0629* (2013.01);

(Continued)

(58) Field of Classification Search
CPC ...... F17C 13/00; F17C 13/001; F17C 13/002; F17C 13/04
USPC ............. 220/560.04, 560.05, 560.07, 560.1, 220/560.11, 560.12, 562, 565, 567.2
See application file for complete search history.

(56) References Cited

U.S. PATENT DOCUMENTS 1,496,144 A    6/1924  Youngblood
1,978,608 A  * 10/1934  Straty .................... B01J 3/002
                                                  219/137 R (Continued)

FOREIGN PATENT DOCUMENTS

DE    102010018301    4/2010
FR         2832783    11/2001

OTHER PUBLICATIONS

Report from International Searching Authority, Patent Cooperation Treaty, International Application No. PCTUS2015023622, dated Jul. 24, 2015.

(Continued)

*Primary Examiner* — Steven A. Reynolds
*Assistant Examiner* — Javier A Pagan
(74) *Attorney, Agent, or Firm* — Baker Botts, LLP

(57) ABSTRACT

According to some embodiments, a cryogenic storage tank includes a manway formed in a body of the cryogenic storage tank. An inner manway lid is coupled to an inner wall of the cryogenic storage tank and disposed over at least a portion of the manway. An outer manway lid is coupled to an outer wall of the cryogenic storage tank and disposed over at least a portion of the manway. The inner and outer manway lids are configured to retain pressure within the cryogenic storage tank.

10 Claims, 13 Drawing Sheets

Related U.S. Application Data

(60) Provisional application No. 61/973,749, filed on Apr. 1, 2014.

(52) U.S. Cl.
CPC . *F17C 2205/0379* (2013.01); *F17C 2221/011* (2013.01); *F17C 2221/012* (2013.01); *F17C 2221/014* (2013.01); *F17C 2221/033* (2013.01); *F17C 2223/0161* (2013.01); *F17C 2227/015* (2013.01); *F17C 2227/0178* (2013.01); *F17C 2260/021* (2013.01); *F17C 2260/038* (2013.01); *F17C 2260/042* (2013.01); *Y02E 60/321* (2013.01); *Y10T 29/49826* (2015.01)

(56) References Cited

U.S. PATENT DOCUMENTS

| | | | | |
|---|---|---|---|---|
| 2,229,082 | A | * | 1/1941 | Van Vleet ............... B61D 5/04 105/357 |
| 3,052,203 | A | * | 9/1962 | James ..................... B63B 25/16 114/74 A |
| 3,453,836 | A | | 7/1969 | Kerr |
| 3,635,599 | A | | 1/1972 | Bryant et al. |
| 3,652,186 | A | | 3/1972 | Carter |
| 3,918,852 | A | | 11/1975 | Carter |
| 4,080,106 | A | | 3/1978 | Haesloop |
| 4,156,584 | A | | 5/1979 | Schuck |
| 5,291,869 | A | * | 3/1994 | Bennett ............... F02M 69/465 123/41.31 |
| 5,659,214 | A | | 8/1997 | Guardiani et al. |
| 5,674,057 | A | | 10/1997 | Guardiani et al. |
| 5,865,605 | A | | 2/1999 | Weidlein |
| 8,439,654 | B2 | | 5/2013 | Cho |
| 2015/0276130 | A1 | | 10/2015 | Hall |

OTHER PUBLICATIONS

Report from International Searching Authority, Patent Cooperation Treaty, International Application No. PCTUS2015023579, dated Jul. 24, 2015.

PCT Notification Concerning Transmittal of International Preliminary Report on Patentability (Chapter I of the Patent Cooperation Treaty, International Application No. PCTUS2015023622, dated Oct. 13, 2016.

PCT Notification Concerning Transmittal of International Preliminary Report on Patentability (Chapter I of the Patent Cooperation Treaty, International Application No. PCTUS2015023579, dated Oct. 13, 2016.

I. K. Hall, U.S. Appl. No. 14/676,334, Non-final Office Action, dated Jan. 12, 2017.

I. K. Hall, U.S. Appl. No. 14/676,334, Response to Non-final Office Action, dated Apr. 11, 2017.

I. K. Hall, U.S. Appl. No. 14/676,334, Final Office Action, dated Jul. 12, 2017.

* cited by examiner

DUAL PRESSURE-RETAINING MANWAY SYSTEM

RELATED APPLICATION

This application claims the benefit of International Patent Application Serial No. PCT/US2015/023622 filed Mar. 31, 2015, entitled "DUAL PRESSURE-RETAINING MANWAY SYSTEM," and claims the benefit of U.S. Provisional Application Ser. No. 61/973,749, entitled "METHOD AND SYSTEM FOR A SUBMERGED PUMP," filed Apr. 1, 2014, the contents of which are incorporated herein in its entirety by this reference.

TECHNICAL FIELD

The present disclosure relates generally to cryogenic liquid storage tanks, and more particularly to a dual pressure-retaining manway system.

BACKGROUND

Cryogenic liquids, such as nitrogen, hydrogen, and liquid oxygen, are typically stored in vacuum-jacketed cryogenic storage tanks. Traditional systems and methods for pumping cryogenic liquid from storage tanks often use liquid pumps housed in a vacuum jacketed sump (e.g., a mini-vacuum jacketed tank outside of the main cryogenic storage tank). Housing a liquid pump in a vacuum jacket, however, increases the cost of pumping operations and is a heat leak. Moreover, many of the current pumps must remain submerged during pumping operations to keep cool and lubricated. While some of the more recent pumps are self-cooling and self-lubricating (e.g., from the cryogenic liquid they pick up and discharge), they are very expensive and businesses and other enterprises operating cryogenic liquid pumps often prefer the older technology—the older submerged pumps are less expensive than the newer pumps and will likely be used extensively at least until the price of the newer pumps fall.

In general, current pump systems are installed using one of three methods. First, a pump may be installed inside an insulated, ASME pressure vessel sump outside of a cryogenic storage tank (e.g., the main storage/supply vessel). Although vacuum-jacketed lines may be run to and from the sump, other components of the sump configuration (e.g., valves, recirculation lines, vent lines, safety relief circuits, sump lid, etc.) often are not vacuum jacketed or otherwise insulated. As such, the sump configuration is not thermally efficient. In addition, insulated lines can be expensive, especially vacuum-jacketed insulated lines.

Second, a pump may be installed inside of a storage tank by mounting the pump to the bottom of the storage tank in a horizontal or vertical orientation. Because most conventional pumps (other than the self-cooling and self-lubricating pumps recently introduced) must remain submerged in cryogen to be cooled and lubricated, current horizontal and vertical arrangements require several inches of cryogenic liquid to be left in the storage tank to keep conventional pumps submerged. For example, a horizontal arrangement often requires a minimum level of at least 12" of cryogenic liquid to remain in the storage tank to keep a pump, such as a 10" diameter pump, submerged. As another example, a vertical arrangement often requires a level of cryogenic liquid in the storage tank equal to the level of the length of the pump. As a result, neither arrangement is efficient for traditional pump systems, as an operator of the pump is prevented from draining all of the cryogenic liquid from the storage tank, which in turn may result in a transportable storage tank carrying a large heel of product that cannot be dispensed or sold. In addition, any repair, replacement, or other maintenance of a traditional pump system may require a service person to drain, purge, warm, and enter into the tank, which may present safety hazards. Doing so also may take multiple days and require confined space entry procedures to be followed for the service person to enter the storage tank via a manway, for example, to remove an old pump and install a new or remanufactured pump.

Third, some very large storage tanks have incorporated a column in the design that extends from the manway opening to near the bottom of the storage tank and for which a pump may be positioned within. The column may be isolated from the rest of the storage tank and may include a foot valve in the bottom of the column. The pump may be configured to (or may use other means to) open the foot valve when the pump is lowered into the column and/or close the foot valve when the pump is removed. Thus, means to raise and lower the pump to open and close the foot valve before the manway is removed may be required; means to actuate the foot valve and raise or lower the pump may be required to be able to initially actuate or raise or lower the pump from outside the storage tank through the manway and/or vacuum jacket with any leakage. Replacing a pump in such a storage tank requires the column to be drained and purged and may also require the storage tank pressure to be vented down to zero; the storage tank may not need to be drained. For example, the column itself may need to be drained once the foot valve closes after removing the pump. As a result, the column also may require a positive pressure nitrogen purge to prevent moist humid air from entering into the column and forming frost on the cold walls of the column. In addition, the foot valve technology needs to be fool proof to seal off the cryogen in the vessel.

Conventional vacuum-jacketed cryogenic storage tanks with accessible manways typically employ a single manway lid. Transportable cryogenic storage tanks often include an inner splash plate suspended a few inches from the bottom inner surface of the manway to prevent cryogenic liquid from splashing up onto an uninsulated manway lid (it is common practice for manufacturers of transportable cryogenic storage tanks to employ such a feature). While some of the current cryogenic storage tanks employ two manway lids, such as an inner manway lid and an outer manway lid, current outer manway lids merely serve as an "environmental seal" (e.g., only operable to keep humid air out the manway). Manufacturers of such storage tanks may include conventional cryogenic service fiberglass insulation and multi-layered super insulation radiant barriers in the space between the two manway lids (e.g., the manway).

SUMMARY

The teachings of the present disclosure relate to a system and method for a submerged pump. The teachings of the present disclosure also relate to a system and method for a dual pressure-retaining manway assembly for a cryogenic storage tank.

In accordance with one embodiment, a system for a submerged pump includes a cryogenic storage tank and a pump chamber. The pump chamber is suspended from a top of the cryogenic storage tank in a vertical orientation. The pump chamber includes a liquid pump operable to pump cryogenic liquid from the cryogenic storage tank.

In accordance with another embodiment, a method for a submerged pump includes suspending a pump chamber from a top of a cryogenic storage tank in a vertical orientation. The pump chamber comprises a liquid pump. The method also includes pumping, by the liquid pump, cryogenic liquid from the cryogenic storage tank.

In accordance with yet another embodiment, a cryogenic storage tank includes a manway formed in a body of the cryogenic storage tank. An inner manway lid is coupled to an inner wall of the cryogenic storage tank and disposed over at least a portion of the manway. An outer manway lid is coupled to an outer wall of the cryogenic storage tank and disposed over at least a portion of the manway. The inner and outer manway lids are configured to retain pressure within the cryogenic storage tank.

In accordance with one embodiment, a method for a dual pressure-retaining manway assembly for a cryogenic storage tank includes forming a manway in a body of a cryogenic storage tank. An inner manway lid is coupled to an inner wall of the cryogenic storage tank and an outer manway lid is coupled to an outer wall of the cryogenic storage tank. The inner and outer manway lids are configured to retain pressure within the cryogenic storage tank.

Technical advantages of particular embodiments may include a system and method for a submerged pump that substantially reduces and/or eliminates at least some of the disadvantages and problems associated with previous systems and methods.

Further technical advantages of particular embodiments may include an easy-access pump chamber system with a pump assembly suspended from a manway assembly. Such a system may reduce the time and complexity necessary for installing and removing a pump assembly from a storage tank, as well as maintaining, operating, and servicing a cryogenic storage tank. For example, a suspended cryogenic submerged pump chamber system may allow a service person to install, remove, and/or service the pump without entering the confined space within a manway of the storage tank and/or requiring the service person to drain or warm the storage tank. Accordingly, the time and effort required for installing, removing, and/or servicing the pump is reduced, as the pump may be removed from the storage tank and replaced quickly (e.g., within a few hours instead of a few days).

Additional technical advantages of particular embodiments include a discharge flex hose and electrical flex connections that are easy to connect to and disconnect from the pump, for example, when a pump assembly is lifted out of an inner vessel of the storage tank via an inner manway assembly.

An additional technical advantage includes installing a pump system inside a storage tank. Positioning a pump within a pump chamber inside the storage tank may be more thermally efficient than conventional pumps positioned within a sump located outside of a storage tank and less expensive than a vacuum-jacketed sump.

Another technical advantage of particular embodiments includes a pump positioned within a pump chamber, which eliminates the requirement of maintaining a minimum liquid level in the storage tank to keep the pump submerged. In particular, contrary to conventional pumping systems, an example system described in the present disclosure may pump most of the cryogenic liquid from the storage tank and still submerge the pump to keep the pump cool inside the pump chamber, for example, whenever pumping operations begin and/or during pumping operations, until the tank is close to empty). Moreover, operators of cryogenic storage tanks may use the older submerged pumps (rather than the more expensive self-cooling and self-lubricating pumps), which may reduce the costs of operating and maintaining cryogenic storage tanks with liquid pumps.

Yet another technical advantage includes at least partially filling a pump chamber with cryogenic liquid to submerge a pump positioned within the pump chamber, thereby cooling and lubricating the pump during pumping operations. This may be done even when the level of cryogenic liquid in the storage tank is lower than the height of the pump.

Further technical advantages of particular embodiments may include a redundant pressure-retaining cryogenic manway system—an inner manway assembly and an outer manway assembly—configured to withstand the maximum allowable working pressure of an inner tank of a cryogenic storage tank. The outer manway assembly with an outer manway lid provides a second leak and pressure barrier to the storage tank (e.g., both the inner and outer manway assemblies and corresponding lids may retain and relieve pressure), thereby serving as a back-up containment system. Such a feature may be very attractive for flammable cryogenic fluids such as liquefied natural gas ("LNG"). For example, in the case of a vapor leak (i.e., an inner manway lid gasket leak and/or a pump discharge flex hose leak), an outer manway lid may contain the leak. The redundant manway system may be used alone or in concert with a suspended cryogenic submerged pump chamber system.

Another technical advantage may include providing a secondary pressure withstanding outer manway lid of an outer manway assembly (in addition to an inner manway lid of an inner manway assembly that is configured to withstand pressure within a storage tank). The outer manway lid may provide redundant back up to an inner primary manway lid seal of an inner manway assembly. Specifically, the outer manway lid may prevent leakage even from a slight inner manway leak, which is especially important for flammable cryogens such as LNG, Ethylene, Hydrogen, Nitrous Oxide, or Ethane. Thus, the outer manway lid may reduce and/or eliminate hazards associated with flammable gas services.

An additional technical advantage may include providing a flange on an inner manway opening ring larger in diameter to accommodate a larger than standard diameter bellows assembly to be installed around an inner manway lid. An even larger diameter outer manway lid also may be provided.

Further technical advantages of particular embodiments may include a vacuum contained on the outside of a bellows assembly, thereby allowing an inner vessel of a storage tank to expand and contract in relation to an outer vessel of the storage tank as it cools down and/or as it warms up when empty.

Another technical advantage may include a manway lid operable to lift up to safely vent gas and/or vapor into the atmosphere to prevent a pressure build up, thereby relieving pressure in the event of a liquid leak or inner manway gasket leak. Doing so may be important as cryogenic liquid expands 600 to 700 times in volume when it changes states from liquid to vapor, given its cold temperature and almost instantaneous expansion into a vapor if exposed to the warmer manway void area and outer manway lid.

Yet another technical advantage of particular embodiments may include a relief valve on an outer manway lid (e.g., a redundant pressure retaining outer manway lid). As such, if a cryogenic discharge flex hose between an inner manway lid and the outer manway lid ever breaks, exposing that area to a rapid pressure rise as the cryogenic liquid warms, flashes into vapor, and expands rapidly in volume, the relief valve may open to release the excess pressure within the manway. For example, the relief valve on the outer manway lid may control over-pressurization in the internal bellows area between the two manway lids, and self-close once the pressure is below the relief valve setting, effectively stopping the venting flammable product until maintenance personnel can safely make repairs. Such features may prevent major incidents and also prevent continued venting and/or leaking of the flammable product, which is not safe or friendly to the environment.

A further technical advantage includes providing a monitoring system configured to detect any leaks within a storage tank, such as a leak between an inner manway lid and an outer manway lid. A monitoring system may include a line from a manway (e.g., between an inner manway lid and an outer manway lid) coupled to a check valve mounted to the outer manway lid and/or other component of the outer manway area. The check valve will prevent humid air from entering into the void area between the inner and outer manway lids (which may be insulated with fiberglass and super insulation), thereby preventing any humid air from causing ice to build up inside the space between the manway lids. Moreover, the line also may be coupled to, or directed to aim beneath, a flammable gas detector. Any leak within the manway may be directed through the check valve through the line and underneath a flammable gas detector. Thus, the monitoring system may detect any leakage within the manway, and in response to detecting a leak, warn and safely shutdown the control system in flammable gas services. Moreover, by including these features, the appropriate person and/or user may be notified of a leak via a flammable gas detector alarm.

Additional technical advantages of particular embodiments may include providing a purge valve on a manway lid, which may serve as an important safety feature for cryogenic storage tanks. A service person performing pump maintenance may open the purge valve to verify that the storage tank is not pressurized before removing the manway lid. As a result, the purge valve may reduce and/or eliminate the risk associated with removing a manway lid from a storage tank (e.g., a manway lid blowing off a storage tank when the bolts are removed because the storage tank is pressurized). A pressure gauge may also be mounted on the outer manway lid to show if the void between the two manway lids is pressurized before attempting to remove the outer manway lid.

Other technical advantages will be readily apparent to one of ordinary skill in the art from the following figures, descriptions, and claims included herein. Moreover, while specific advantages have been enumerated above, certain embodiments of the present disclosure may include all, some, or none of the enumerated advantages.

BRIEF DESCRIPTION OF THE DRAWINGS

A more complete and thorough understanding of the particular embodiments and advantages thereof may be acquired by referring to the following description taken in conjunction with the accompanying drawings, in which like reference numbers indicate like features, and wherein.

DETAILED DESCRIPTION

Figure 1:
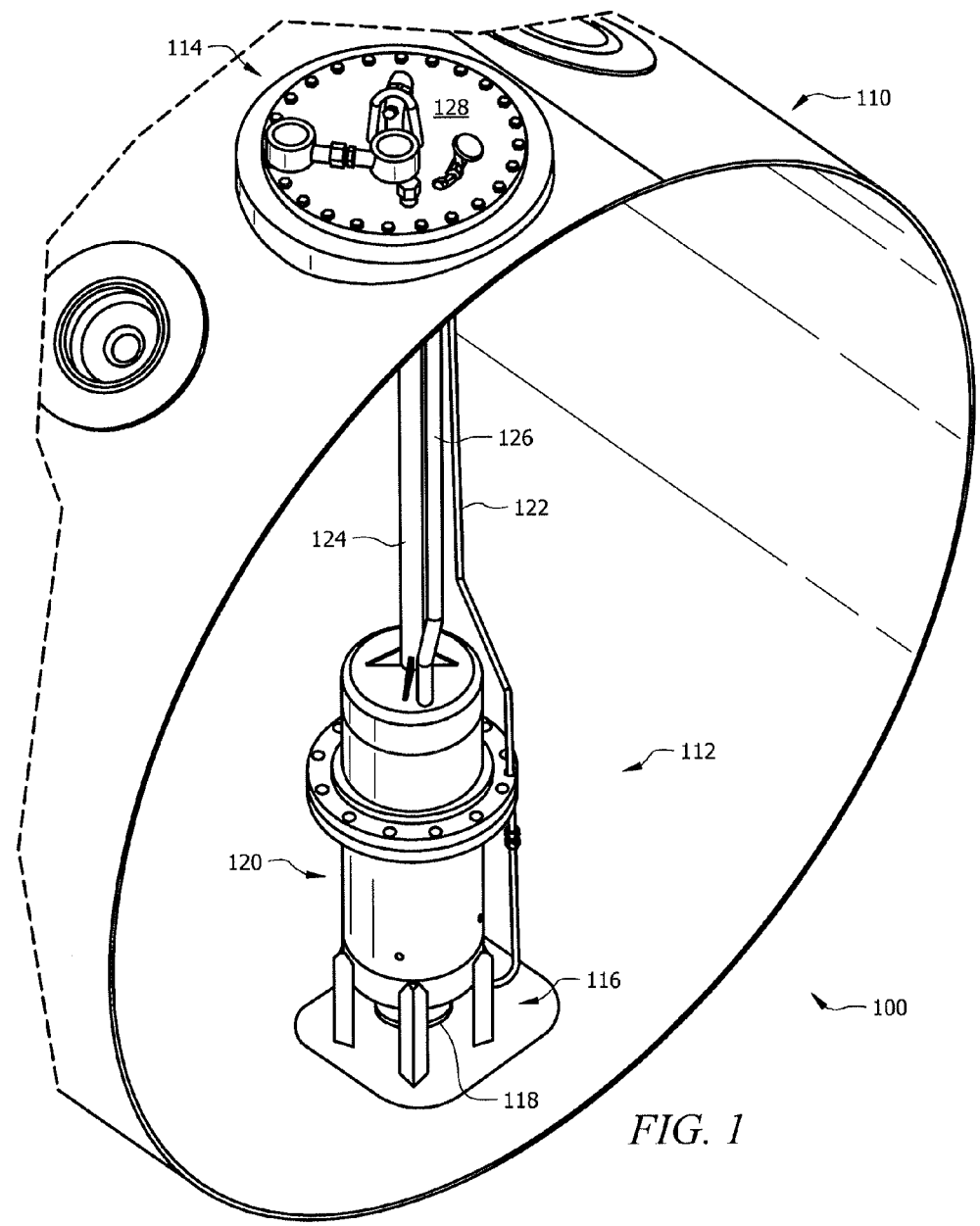
FIG. 1 illustrates an example system for a submerged pump in accordance with an embodiment of the present disclosure.

Particular embodiments of the present disclosure and its advantages are best understood by reference to FIGS. 1 through 12, like numerals being used for like and corresponding parts of the various drawings.

Cryogenic liquids, such as nitrogen, hydrogen, and liquid oxygen, are typically stored in vacuum-jacketed cryogenic storage tanks. Traditional systems and methods for pumping cryogenic liquid from storage tanks often use liquid pumps housed in a vacuum jacketed sump (e.g., a mini-vacuum jacketed tank outside of the main cryogenic storage tank). Housing a liquid pump in a vacuum jacket, however, increases the cost of pumping operations and is a heat leak. Moreover, many of the current pumps must remain submerged during pumping operations to keep cool and lubricated. While some of the more recent pumps are self-cooling and self-lubricating (e.g., from the cryogenic liquid they pick up and discharge), they are very expensive and businesses and other enterprises operating cryogenic liquid pumps often prefer the older technology—the older submerged pumps are less expensive than the newer pumps and will likely be used extensively at least until the price of the newer pumps fall.

In general, current pump systems are installed using one of three methods. First, a pump may be installed inside an insulated, ASME pressure vessel sump outside of a cryogenic storage tank (e.g., the main storage/supply vessel). Although vacuum-jacketed lines may be run to and from the sump, other components of the sump configuration (e.g., valves, recirculation lines, vent lines, safety relief circuits, sump lid, etc.) often are not vacuum jacketed or otherwise insulated. As such, the sump configuration is not thermally efficient. In addition, insulated lines can be expensive, especially vacuum-jacketed insulated lines.

Second, a pump may be installed inside of a storage tank by mounting the pump to the bottom of the storage tank in a horizontal or vertical orientation. Because most conventional pumps (other than the self-cooling and self-lubricating pumps recently introduced) must remain submerged in cryogen to be cooled and lubricated, current horizontal and vertical arrangements require several inches of cryogenic liquid to be left in the storage tank to keep conventional pumps submerged. For example, a horizontal arrangement often requires a minimum level of at least 12" of cryogenic liquid to remain in the storage tank to keep a pump, such as a 10" diameter pump, submerged. As another example, a vertical arrangement often requires a level of cryogenic liquid in the storage tank equal to the level of the length of the pump. As a result, neither arrangement is efficient for traditional pump systems, as an operator of the pump is prevented from draining all of the cryogenic liquid from the storage tank, which in turn may result in a transportable storage tank carrying a large heel of product that cannot be dispensed or sold. In addition, any repair, replacement, or other maintenance of a traditional pump system may require a service person to drain, purge, warm, and enter into the tank, which may present safety hazards. Doing so also may take multiple days and require confined space entry procedures to be followed for the service person to enter the storage tank via a manway, for example, to remove an old pump and install a new or remanufactured pump.

Third, some very large storage tanks have incorporated a column in the design that extends from the manway opening to near the bottom of the storage tank and for which a pump may be positioned within. The column may be isolated from the rest of the storage tank and may include a foot valve in the bottom of the column. The pump may be configured to (or may use other means to) open the foot valve when the pump is lowered into the column and/or close the foot valve when the pump is removed. Thus, means to raise and lower the pump to open and close the foot valve before the manway is removed may be required; means to actuate the foot valve and raise or lower the pump may be required to be able to initially actuate or raise or lower the pump from outside the storage tank through the manway and/or vacuum jacket with any leakage. Replacing a pump in such a storage tank requires the column to be drained and purged and may also require the storage tank pressure to be vented down to zero; the storage tank may not need to be drained. For example, the column itself may need to be drained once the foot valve closes after removing the pump. As a result, the column also may require a positive pressure nitrogen purge to prevent moist humid air from entering into the column and forming frost on the cold walls of the column. In addition, the foot valve technology needs to be fool proof to seal off the cryogen in the vessel.

Conventional vacuum-jacketed cryogenic storage tanks with accessible manways typically employ a single manway lid. Transportable cryogenic storage tanks often include an inner splash plate suspended a few inches from the bottom inner surface of the manway to prevent cryogenic liquid from splashing up onto an uninsulated manway lid (it is common practice for manufacturers of transportable cryogenic storage tanks to employ such a feature). While some of the current cryogenic storage tanks employ two manway lids, such as an inner manway lid and an outer manway lid, current outer manway lids merely serve as an "environmental seal" (e.g., only operable to keep humid air out the manway). Manufacturers of such storage tanks may include conventional cryogenic service fiberglass insulation and multi-layered super insulation radiant barriers in the space between the two manway lids (e.g., the manway).

The teachings of this disclosure recognize that it would be desirable to provide a system and method for a submerged pump positioned within a pump chamber of a pump assembly that is easy to install in and remove from a cryogenic storage tank, and eliminates the need to maintain a minimum level of cryogenic liquid in a cryogenic storage tank equal to a height of the pump (relative to the bottom of the storage tank). The teachings of the present disclosure also recognize that it would be desirable to provide a dual pressure-retaining manway system (which may be interchangeably referred to herein as a "dual pressure-retaining manway assembly") that provides a secondary pressure barrier and reduces hazards associated with maintaining and operating cryogenic storage tanks.

FIG. 1 illustrates an example system for a submerged pump in accordance with an embodiment of the present disclosure. In general, system 100 includes a storage tank 110, a pump assembly 112, and a manway assembly 114.

System 100 generally utilizes a liquid pump of a pump assembly 112 to pump cryogenic liquid from a storage tank 110. The liquid pump may be positioned within a pump chamber of pump assembly 112. The pump chamber may refer to a pipe configured to house the pump. In certain embodiments, a suction nozzle of pump assembly 112 may be coupled to the pump via an inlet in the bottom of the pump chamber (i.e., the suction nozzle may be outside of the pump chamber). A discharge pipe of pump assembly 112 may suspend the pump chamber (and liquid pump) from a top of storage tank 110 (e.g. from an inner manway lid of storage tank 110), for example, such that the suction nozzle is located a few inches above the bottom of the storage tank.

In an example operation, system 100 may use a suction nozzle to draw cryogenic liquid from a storage tank 110 into a pump. The cryogenic liquid drawn into the pump may be discharged through a discharge flange coupled to the pump and directed toward the sides of the pump chamber. Accordingly, the discharged cryogenic liquid quickly fills the pump chamber, thereby submerging the pump with cryogenic liquid to cool and lubricate the pump (e.g., within seconds). Once system 100 fills the pump chamber with cryogenic liquid, the cryogenic liquid may be pushed upward through a discharge pipe and out a port of a manway lid to exit storage tank 110. In other words, system 100 utilizes cryogenic liquid pumped from a storage tank 110 to cool and lubricate a pump positioned within a pump chamber in storage tank 110 before the cryogenic liquid is discharged from storage tank 110.

Storage tank 110 is generally configured to store cryogenic liquid, such as methane, nitrogen, hydrogen, oxygen, and/or any other liquefied gas. Storage tank 110 may include a spray header, a sparger, a vent circuit, a fill and drain circuit, any other piping circuit, any other suitable component, and/or any number and combination of the preceding. In particular embodiments, storage tank 110 may be a dual-walled cryogenic tank equipped with a vacuum jacket. For example, storage tank 110 may include an inner vessel and an outer vessel. The space between the inner and outer vessels may be insulated and vacuumed. The vacuum jacket may minimize the transfer of heat to cryogenic liquid stored in storage tank 110.

As illustrated in FIG. 1, a pump assembly 112 is suspended from a top of storage tank 110 (e.g., from an inside surface of a manway lid of storage tank 110). Pump assembly 112 may be suspended from the top of storage tank 110 by manway assembly 114 and prevented from swinging within storage tank 110 by alignment guides 116. In certain embodiments, pump assembly 112 may be suspended from the top of storage tank 110 in a vertical orientation. Alternatively, pump assembly 112 may be suspended from the top of storage tank 110 in any other suitable orientation, such as a horizontal orientation.

Pump assembly 112 is generally operable to discharge cryogenic liquid from storage tank 110 (e.g., pump and remove cryogenic liquid from inside of storage tank 110 to outside of storage tank 110). An example pump assembly 112 of system 100 may refer to a suspended, submerged cryogenic pump system that may be easily accessed and removed from storage tank 100. Pump assembly 112 may include a suction nozzle 118, a pump chamber 120, a purge pipe 122, a discharge pipe 124, an electrical tubing conduit 126, and a liquid pump (discussed in more detail below).

Suction nozzle 118 facilitates pumping cryogenic liquid from storage tank 110. Suction nozzle 118 may be coupled to an end of pump chamber 120. For example, suction nozzle 118 and pump chamber 120 may be coupled together by a threaded nipple welded to an end of pump chamber 120 (e.g., a bottom exterior surface of pump chamber 120). As such, suction nozzle 118 may be connected to pump chamber 120 by screwing suction nozzle 118 into the threaded nipple. As another example, suction nozzle 118 and pump chamber 120 may be coupled together by a threaded female half coupling and/or any other suitable means. According to the illustrated embodiment, suction nozzle 118 is positioned a few inches above a bottom interior surface of storage tank 110, which may maximize the amount of cryogenic liquid that may be pumped from storage tank 110 (e.g., before a liquid pump of pump assembly 112 looses prime). In certain embodiments, suction nozzle 118 may protrude down into a sump (not shown) in the bottom of a storage tank 110. For example, a low point sump may be incorporated into the bottom of storage tank 110 and suction nozzle 118 may extend down into the sump, thus allowing removal of the maximum amount of cryogenic liquid from storage tank 110.

Pump assembly 112 generally includes a pump chamber 120 suspended from the top of storage tank 110, for example, in a vertical orientation. Pump chamber 120 may be a large diameter discharge pipe and may be configured to house a liquid pump operable to pump cryogenic liquid from storage tank 110. In certain embodiments, a lip may be bolted to the bottom of pump chamber 120 or anywhere along the length of pump chamber 120. In such embodiments, a liquid pump may be installed within pump chamber 120 and electrical power leads may be connected to a motor of the liquid pump. In certain embodiments, pump chamber 120 may surround all of the liquid pump except for a suction nozzle. In such embodiments, the discharge flange may be coupled to the pump, and the suction nozzle and/or a side of the pump may be sealed outside of the pump chamber. The suction nozzle and/or the side of the pump may be located a few inches above the bottom of the storage tank (or protruding down into a sump in the bottom of the storage tank).

Purge pipe 122, discharge pipe 124, and electrical conduit 126 may be coupled to pump chamber 120 and manway assembly 114. As illustrated, purge pipe 122 may be formed from small tubing and may be coupled to the bottom of pump chamber 120. Purge pipe 122 generally facilitates the draining and purging of pump chamber 120. For example, purge pipe 122 may be used to drain any liquid in pump chamber 120 (e.g., before any maintenance is performed). In certain embodiments, purge pipe 122 may be configured to purge pump chamber 120 with vapor or gas prior to access and maintenance by a service person. In such embodiments, purge pipe 122 may be coupled to a purge gas source to provide pump chamber 120 with vapor or gas from the purge gas source (e.g., gaseous nitrogen). An example purge pipe 122 may be a stainless steel pipe having a small diameter, such as a diameter of approximately ½" (inch) or any other suitable diameter.

In certain embodiments, purge pipe 122 may be coupled to the top of pump chamber 120. In such embodiments, purge pipe 122 may be communicatively coupled to a dip tube positioned within pump chamber 120. The dip tube may extend from a top portion of an interior wall of pump chamber 120 to a bottom portion of the interior wall of pump chamber 120.

Discharge pipe 124 may be coupled to the top of pump chamber 120 and configured to suspend pump chamber 120 from the top of storage tank 110. Discharge pipe 124 also may be configured to receive cryogenic liquid pumped from storage tank 110 (e.g., liquid discharged from a liquid pump positioned within pump chamber 120). In certain embodiments, discharge pipe 124 may be coupled to liquid receivers (not shown) that receive and store liquid pumped from storage tank 110. Discharge pipe 124 may be a large diameter pipe, in certain embodiments.

In certain embodiments, discharge pipe 124 may not be in liquid communication with pump chamber 120 and/or a pump (e.g., discharge pipe 124 may not be configured to receive cryogenic liquid pumped from storage tank 110). For example, discharge pipe 124 may be used to suspend a pump and/or a pump chamber 120 from a top of a storage tank 110 (e.g., from the bottom of a manway lid of a storage tank). A discharge line may extend from outside of storage tank 110 to inside of storage tank 110 via an inlet/port of storage tank 110 and may be configured to receive cryogenic liquid pumped from storage tank 110 (e.g., liquid discharged from a pump within storage tank 110). In such an example, the discharge line inside of storage tank 110 may be coupled to a flex hose that may be attached to a port on a lower portion of pump chamber 120 and/or coupled to a pump. Accordingly, cryogenic liquid may be discharged from storage tank 110 via the flex house and discharge line.

Electrical conduit 126 may be operable to provide electricity to pump chamber 120 (e.g., for a liquid pump within pump chamber 120). In certain embodiments, electrical conduit 126 may house various electrical wires that may be electronically coupled to a liquid pump within pump chamber 120 to facilitate pumping cryogenic liquid from storage tank 110. An example electrical conduit 126 may be a stainless steel conduit that houses high voltage electrical wiring, such as 480-volt, 3-phase electrical wiring (with cryogenic rated Teflon insulation on the wires).

In general, manway assembly 114 includes an inner manway lid 128 configured to couple to a wall of storage tank 110 and to cover at least a portion of a manway formed in a body of storage tank 110. In certain embodiments, inner manway lid 128 may be used to suspend pump assembly 112 from the top of storage tank 110. For example, pump assembly 112 (and pump chamber 120) may be attached to and suspended from a surface of inner manway lid 128, such as an inner surface of inner manway lid 128. By suspending pump assembly 112 from inner manway lid 128, pump assembly 112 may be installed in and/or removed from storage tank 110 without a service person having to enter, drain, or warm storage tank 110. In certain embodiments, before performing any pump maintenance, the following may be recommended or required: (1) draining storage tank 110; (2) venting storage tank 110 to zero PSI; and/or (3) for flammable products, a nitrogen blanket purge. In certain embodiments, purge pipe 122, discharge pipe 124, and/or electrical conduit 126 may be secured to inner manway lid 128.

System 100 generally includes alignment guides 116 for installing and securing pump assembly 112 in place within storage tank 110. For example, alignment guides 116 may be used to prevent pump assembly 112 (and pump chamber 120) from swinging side to side like a pendulum (e.g., when storage tank 110 is transported over the road). Alignment guides 116 may be welded to a bottom interior surface of storage tank 110. The present disclosure contemplates alignment guides 116 having any suitable shape or configuration (e.g., alignment guides 116 may be spaced apart in any manner).

In certain embodiments, alignment guides 116 may be used to guide pump assembly 112 (and chamber 120) into place when installing and lowering pump assembly 112 into storage tank 110. In such embodiments, alignment guides 116 may include angled guide surfaces. Each angled guide surface may define an angle (e.g., from 0 degrees to 90 degrees) relative to a central axis of pump chamber 120 (which may be vertical (e.g., perpendicular to the bottom of storage tank 110), horizontal (e.g., parallel to the bottom of storage tank 110), off-set (e.g., off-set angle to the bottom of storage tank 110), etc.). Alignment guides 116 also may be used as a vortex breaker (e.g., at a nozzle inlet of a liquid pump of pump chamber 120).

Although FIG. 1 illustrates system 100 as including one pump assembly 112 and one manway assembly 114, system 100 may include any number of pump assemblies 112, manway assemblies 114, and other suitable components. For example, system 100 may include two pump assemblies 112 and two manway assemblies 114. Additionally, although particular examples of pump assembly 112, manway assembly 114, and alignment guides 116 have been described, this disclosure contemplates any suitable pump assembly 112, manway assembly 114, and alignment guides 116 comprising any suitable components configured in any suitable manner, according to particular needs.

Figure 2:
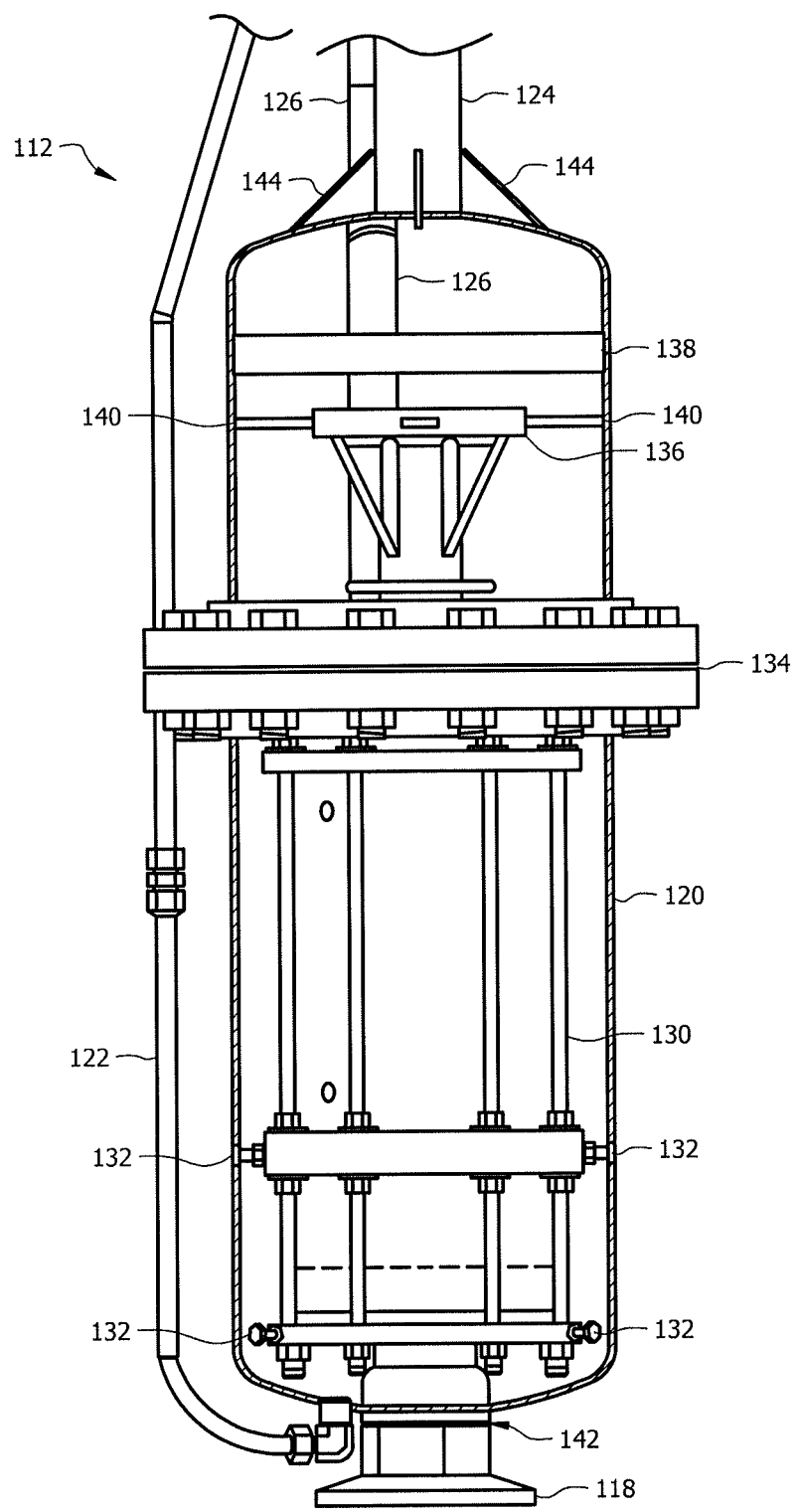
FIG. 2 illustrates a partially-transparent side view of an example pump assembly in accordance with an embodiment of the present disclosure.

FIG. 2 illustrates a partially-transparent side view of an example pump assembly in accordance with an embodiment of the present disclosure. Pump assembly 112 may include suction nozzle 118, pump chamber 120, purge pipe 122, discharge pipe 124, and electrical conduit 126. Pump assembly 112 may be used to pump cryogenic liquid from a cryogenic storage tank, such as storage tank 110.

A pump chamber 120 is generally configured to house and submerge a liquid pump, such as pump 130. Pump chamber 120 may refer to a large diameter pipe and may be suspended from a top of storage tank 110, for example, in a vertical orientation. In certain embodiments, pump chamber 120 may be suspended from the bottom of a manway lid 128 configured to couple to a top of storage tank 110.

As illustrated, pump chamber 120 includes a pump 130. Pump 130 may be positioned within pump chamber 120 in any suitable manner. As an example, pump 130 may be positioned vertically, horizontally, offset, etc., within pump chamber 120. Pump 130 may be secured within pump chamber 120 by bumpers 132 (e.g., tabs configured to prevent pump 130 from moving side to side inside of pump chamber 120). In certain embodiments, pump 130 may be housed in a lower section of pump chamber 120. For example, pump chamber 120 may include a top section (which may define openings through which a discharge pipe 124 and an electrical conduit 126 extend into pump chamber 120) and a lower section (which may house pump 130 and include an opening in the bottom for receiving liquid from suction nozzle 118). The top and bottom sections of pump chamber 120 may be sealed together using a flange joint 134 (e.g., the top and lower sections are bolted/sealed together with a gasket therebetween (to seal the pressurized discharge flow from the pump from leaking out of the pump chamber such that all of the discharge may be directed up and out the discharge pipe). In such an example, pump 130 may be inserted into the lower section of pump chamber 120 and electronically coupled to electrical wiring connections before the top and bottom sections are bolted together at flange joint 134.

In certain embodiments, pump 130 may be attached to pump chamber 120 by a threaded half coupling (and/or male threaded nipple and/or any other suitable component configured to seal to an inlet port of pump 130) welded inside the bottom of pump chamber 120 over a suction port opening (not shown). For example, to install pump 130 (e.g., a pump with, for example, a male threaded nipple coupled to the suction end) in pump chamber 120, pump 130 may be rotated and screwed into the threaded half coupling in the bottom of pump chamber 120.

Pump 130 is generally operable to pump cryogenic liquid from storage tank 110 and may refer to an electric cryogenic pump, such as a TC34KA or other submerged pump. Pump 130 may include a built-in motor, in certain embodiments. Pump 130 may be coupled to a discharge flange 136 configured to receive cryogenic liquid from pump 130. In general, pump 130 pumps cryogenic liquid from storage tank 110 and discharges cryogenic liquid into pump chamber 120 via discharge flange 136. The discharged cryogenic liquid at least partially fills pump chamber 120 to submerge pump 130, and thereby cools and lubricates pump 130 during pumping operations. By filling pump chamber 120 with cryogenic liquid from storage tank 110, pump 130 may be lubricated and cooled even when the level of cryogenic liquid in storage tank 110 is lower than the height of pump 130.

Pump 130 generally utilizes a suction nozzle 118 to pump cryogenic liquid from storage tank 110. Suction nozzle 118 may be a substantially conical-shaped nozzle with a substantially cylindrical-shaped passage and may be coupled to pump 130 (e.g., through an opening in the bottom of pump chamber 120) by a short threaded nipple 142. For example, a suction port of pump 130 may be connected (e.g., screwed) to a liquid inlet port in the bottom of pump chamber 120 and suction nozzle 118 may be connected (e.g., screwed) onto the bottom outside of pump chamber 120 using threaded nipple 142, thereby coupling suction nozzle 118 to pump 130 (e.g., the cryogenic liquid flows directly into the suction end of pump 130 with no communication to the inside of pump chamber 120). Thus, pump 130 may draw liquid from storage tank 110 through suction nozzle 118 and into pump 130. In other words, suction nozzle 118 may be an inlet to pump 130. In certain embodiments, suction nozzle 118 may include a built-in strainer. The built-in strainer may include filter media that may filter out impurities and contaminants from the cryogenic liquid as the cryogenic liquid passes from storage tank 110, through suction nozzle 118, through pump 130, and then into pump chamber 120 during pumping operations. Suction nozzle 118 may also include built-in vortex breaking features.

Pump chamber 120 also may include a discharge flange 136 and a flow diverter 138. Discharge flange may be built into and/or a part of the pump body casting. In certain embodiments, discharge flange 136 may be coupled to pump 130 and may be secured within pump chamber 120 by guides 140. For example, four guides 140 (e.g., tabs) may be welded to the inside of pump chamber 120 at a height of discharge flange 136 to prevent discharge flange 136 and the top of pump 130 from swaying from side to side within pump chamber 120. Discharge flange 136 is typically configured to receive cryogenic liquid from pump 130 and discharge the cryogenic liquid around pump 130 to at least partially fill pump chamber 120 with the discharged cryogenic liquid (e.g., once pump 130 begins pumping cryogenic liquid from storage tank 110).

According to the illustrated embodiment, flow diverter 138 may facilitate directing the flow of the discharged cryogenic liquid downward and/or outward such that cryogenic liquid runs down the sides of pump 130 to immediately fill the pump chamber with cryogenic liquid to cool and lubricate pump 130. Flow diverter 138 may be a piece of angle, in certain embodiments.

In certain embodiments, discharge flange 136, flow diverter 138, and/or pump chamber 120 may be designed to minimize any turbulence or vortices in the discharged cryogenic liquid in pump chamber 120 when pump 130 begins pumping cryogenic liquid from storage tank 110. In particular embodiments, impellors inside of pump 130 may spin and generate discharge pressure to push cryogenic liquid through the top of pump 130 and into discharge flange 136.

As illustrated, pump chamber 120 is communicatively coupled to suction nozzle 118, purge pipe 122, discharge pipe 124, and electrical conduit 126. In certain embodiments, a first end of purge pipe 122 may be coupled to the bottom of pump chamber 120. Alternatively, purge pipe 122 may be coupled to the top of pump chamber 120 (discussed below in more detail with regard to FIGS. 4A-4B). Purge pipe 122 may be configured to drain any liquid stuck in pump chamber 120, for example, before any maintenance is performed. In certain embodiments, purge pipe 122 may refer to small tubing configured to purge pump chamber 120 with vapor or gas prior to access and maintenance by a service person. In such embodiments, a second end (e.g., the end connected to a port through an inner manway lid) of purge pipe 122 may be coupled to a purge gas source at a valve to provide pump chamber 120 with vapor or gas from the purge gas source (e.g., gaseous nitrogen). In various embodiments, purge pipe 122 may include a union fitting, for example, when pump chamber 120 is separated into two halves (e.g., a top section and a bottom section, as described above).

Discharge pipe 124 may be coupled to the top of pump chamber 120 and may be configured to receive cryogenic liquid pumped from storage tank 110 (e.g., liquid discharged from pump 130 into pump chamber 120 via discharge flange 136). Discharge pipe 124 may include gussets 144. Gussets 144 may be welded to both discharge pipe 124 and pump chamber 120 to reinforce the connection coupling discharge pipe 124 to pump chamber 120.

Electrical conduit 126 may be coupled to the top of pump chamber 120 and may be operable to provide electricity to pump 130. In certain embodiments, electrical conduit 126 may house various electrical wires that may be electronically coupled to pump 130. For example, electrical wires housed in electrical conduit 126 may extend into pump chamber 120 through openings in pump chamber 120 where electrical conduit 126 and pump chamber 120 are connected.

In operation, pump 130 may pump cryogenic liquid from storage tank 110 using suction nozzle 118. The cryogenic liquid drawn into pump 130 through suction nozzle 118 may be discharged out of discharge flange 136 and directed toward the sides of pump 130 by flow diverter 138. As such, the discharged cryogenic liquid spills down around pump 130 and quickly fills pump chamber 120 with cryogenic liquid to "submerge" pump 130 and thereby cool and lubricate pump 130. Pump chamber 120 may be filled and pump 130 submerged with cryogenic liquid within a few seconds of starting pump 130 (depending on the manufacturer, a pump 130 may run dry for a few seconds without being submerged). Once pump chamber 120 is filled with discharged cryogenic liquid, the discharged cryogenic liquid in pump chamber 120 may be forced upward into discharge pipe 124 (e.g., through a pump chamber outlet) and then out a port in a manway lid (e.g., inner manway lid 128 of FIG. 1).

In general, pump chamber 120 is filled with cryogenic liquid pumped from storage tank 110—and pump 130 and the corresponding motor are cooled and lubricated—before the cryogenic liquid is discharged out of storage tank 110 via discharge pipe 124. Therefore, unlike conventional submerged pump systems where a pump is not housed in a pump chamber, cryogenic liquid stored in storage tank 110 may be discharged to a level much lower than a height of a pump 130 (e.g., cryogenic liquid may be discharged until pump 130 can no longer pump cryogenic liquid from storage tank 110 and pump 130 looses prime).

In certain embodiments, when storage tank 110 is full of cryogenic liquid, pump chamber 120 is also full of cryogenic liquid. Accordingly, when the level of cryogenic liquid in storage tank 110 is low, and pump 130 is not running (e.g., pumping cryogenic liquid from storage tank 110), the level of cryogenic liquid in pump chamber 120 will be approximately the same as the level of cryogenic liquid in storage tank 110.

In various embodiments, pump 130 does not always need to be submerged. In particular, an operator does not need to maintain a minimum level of cryogenic liquid in storage tank 110 (e.g., a level equal to the height of pump 130) to keep pump 130 submerged. Thus, more product (e.g., cryogenic liquid) may be dispensed from storage tank 110. And dispensing this product may be initiated and performed when the product is at a much lower level in storage tank 110 than the height of pump 130. For example, as long as pump 130 can still catch prime (which to catch prime, the pump conditions must meet Net Positive Head Suction-NPSH-requirements), an operator may continue to dispense product from storage tank 110. In such an example, as soon as a pumping operation begins and pump 130 catches prime, pump 130 discharges cryogenic liquid through discharge flange 136 to fill pump chamber 120 with cryogenic liquid (even when the cryogenic liquid level in storage tank 110 is lower than the height of pump 130) to cool and lubricate pump 130 as pump 130 continues to pump remaining cryogenic liquid from storage tank 110.

In certain embodiments, pump 130 may catch prime until the cryogenic liquid in storage tank 110 is discharged to a level of only a few inches (e.g., enough to surround suction nozzle 118 until the pump loses prime). Accordingly, depending upon the height of suction nozzle 118 from the bottom of storage tank 110 and the design of the bottom of storage tank 110, most of the cryogenic liquid in storage tank 110 may be withdrawn from storage tank 110, which may be done in a single pumping operation or over time with multiple dispense operations.

In certain embodiments, pump assembly 112 may include a recirculation piping circuit having a pump recirculation line coupled to pump 130 and a pump recirculation valve coupled to the pump recirculation line. A pump recirculation line may utilized by pump 130 to catch prime. For example, if down stream piping includes a recirculation piping circuit (e.g., a valved loop back to storage tank 110), pump 130 may catch prime pumped back into storage tank 110 by the recirculation piping circuit. Once pump 130 catches prime, pump 130 may speed up and the discharge opened to pump downstream, and the recirculation valve may be closed. In other words, discharge from pump 130 may be pushed out of storage tank 110 and then dumped back into storage tank 110, for example, until pump 130 comes up to full speed and stabilizes. Discharge flow also may be recirculated using a pump recirculation circuit while an operator is preparing to dispense cryogenic liquid from storage tank 110. In certain embodiments, when pump 130 is not running, a pump recirculation valve coupled to a pump recirculation line may be left "normally open." Alternatively, if a system comprising pump assembly 112 and outside piping circuits is plumbed, the recirculation valve and the pump discharge valve may be left closed. In certain embodiments, if the discharge valve is closed immediately after pump 130 stops pumping, any cryogenic liquid still remaining in pump assembly 112 may warm and vaporize, thereby raising the pressure within that piping circuit. In such embodiments, leaving the discharge valve open for a certain period of time after pump 130 stops operating may be recommended (e.g., for thermal efficiency reasons). Once a sufficient amount of time has elapsed for any of the remaining cryogenic liquid in the lines to vaporize, the recirculation valve may be closed (or left open).

Although FIG. 2 illustrates pump assembly 112 as including one suction nozzle 118, one pump chamber 120, one purge pipe 122, one discharge pipe 124, one electrical conduit 126, and one pump 130, pump assembly 112 may include any number of suction nozzles 118, pump chambers 120, purge pipes 122, discharge pipes 124, electrical conduits 126, pumps 130, and other suitable components. Additionally, although particular examples of pump assembly 112 have been described, this disclosure contemplates any suitable pump assembly 112 comprising any suitable components configured in any suitable manner, according to particular needs. Moreover, any component of pump assembly 112 may be separate from or integral to any component of FIG. 2.

Figure 3:
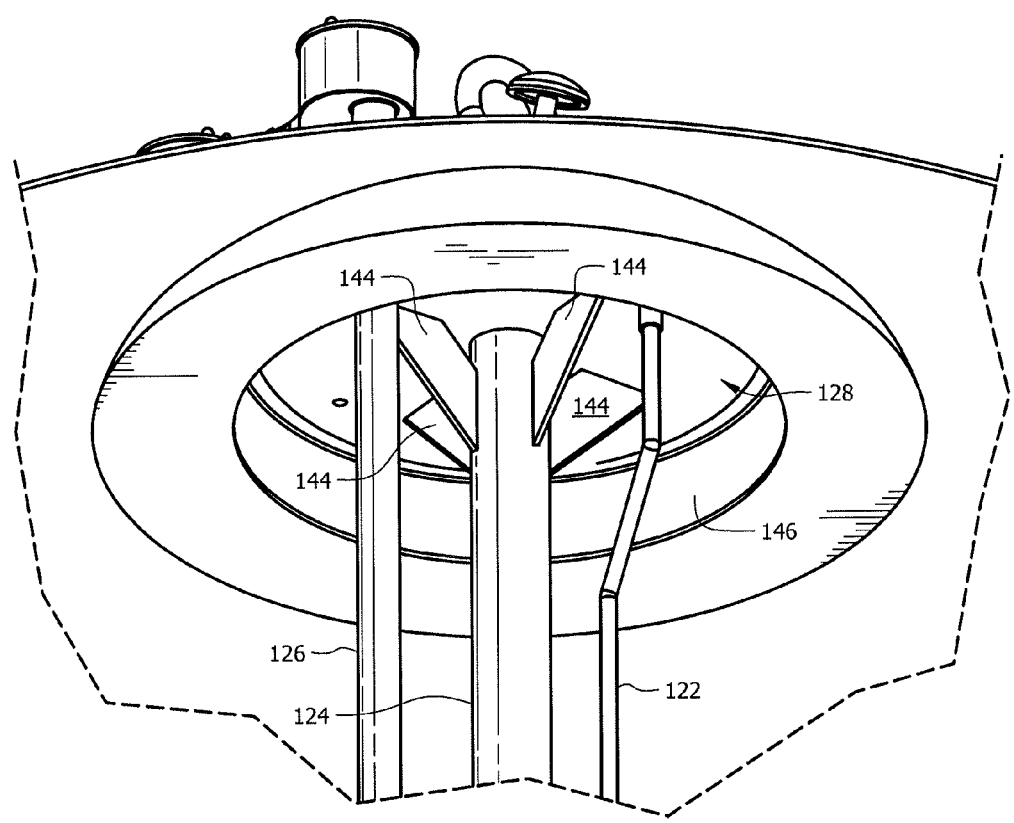
FIG. 3 illustrates a bottom view of an example inner manway lid in accordance with an embodiment of the present disclosure.

FIG. 3 illustrates a bottom view of an example inner manway lid in accordance with an embodiment of the present disclosure. In general, a pump assembly, such as pump assembly 112 (of FIGS. 1-2), is attached to and suspended from a manway lid, such as an inner manway lid 128. For example, purge pipe 122, discharge pipe 124, and electrical conduit 126 may be coupled to (or otherwise attached to) inner manway lid 128. In such an example, pump assembly 112 may be removed from storage tank 110 by lifting inner manway lid 128 out of storage tank 110.

Inner manway lid 128 may be coupled to an inner wall of a storage tank 110 and may be disposed over at least a portion of a manway 146 formed in a body of storage tank 110. In certain embodiments, inner manway lid 128 may include a lip to center and secure inner manway lid 128 over manway 146 (e.g., to prevent inner manway lid 128 from sliding off of manway 146 and storage tank 110).

Manway 146 may refer to an access opening located in an upper portion of storage tank 110 and/or a passage formed in a body of storage tank 110. Thus, manway 146 may provide access to an interior of storage tank 110. For example, an operator maintaining or servicing storage tank 110 may access and enter storage tank 110 through manway 146.

In general, one end of purge pipe 122 is coupled to inner manway lid 128 and another end of purge pipe 122 is coupled to a pump chamber and/or a pump (e.g., pump chamber 120 and/or pump 130 of FIGS. 1-2). In certain embodiments, purge pipe 122 is coupled to an interior surface and/or bottom of inner manway lid 128. As described above, purge pipe 122 may be small tubing for purging a pump chamber 120 with vapor or gas, such as nitrogen, prior to access and maintenance by a service person. In certain embodiments, a port and/or other opening in inner manway lid 128 may be used to couple purge pipe 122 to a purge gas source coupled to a purge valve located on an exterior surface of inner manway lid 128 and/or storage tank 110, and/or outside of storage tank 110 (e.g., a purge gas source separate from storage tank 110). The purge gas source may provide pump chamber 120 with vapor or gas (e.g., gaseous nitrogen) via purge pipe 122.

Discharge pipe 124 is generally coupled to inner manway lid 128 and a pump chamber 120. For example, a first end of discharge pipe 124 may be coupled to pump chamber 120 and a second end of discharge pipe 124 may be coupled to an interior surface and/or bottom of inner manway lid 128. In certain embodiments, discharge pipe 124 may be secured to a bottom surface of inner manway lid 128 by a weld. In certain embodiments, discharge pipe 124 may include gussets 144 to prevent discharge pipe 124 from flexing where discharge pipe 124 connects to inner manway lid 128 (e.g., due to the long length of discharge pipe 124). For example, gussets 144 may be welded to discharge pipe 124 and inner manway lid 128 to reinforce the connection coupling discharge pipe 124 to inner manway lid 128.

Discharge pipe 124 may be a large diameter discharge pipe configured to suspend a pump chamber 120 from a top of storage tank 110 via inner manway lid 128. An example discharge pipe 124 may be made from an elongate length of material such as metal. In certain embodiments, discharge pipe 124 may be configured to receive cryogenic liquid pumped from storage tank 110 (e.g., liquid discharged from a liquid pump positioned within a pump chamber). As such, discharge pipe 124 may be utilized by a pump (such as pump 130 of FIG. 2) to push discharge flow up and out through inner manway lid 128 (and out of storage tank 110).

Electrical conduit 126 may be coupled to an inner surface and/or bottom of inner manway lid 128. Electrical conduit 126 also may be coupled to a pump chamber 120 and/or a pump 130. In various embodiments, electrical conduit 126 may be configured to enclose and protect cryogenically compatible insulated wiring used to provide electricity to a pump 130. For example, electrical conduit 126 may house various electrical wires that may be electronically coupled to pump 130. In such an example, electrical wires housed in electrical conduit 126 may extend into pump chamber 120 through one or more openings in pump chamber 120 where electrical conduit 126 and pump chamber 120 are connected. In certain embodiments, the top of inner manway lid 128 may provide dual (in-series) pressure pass-through fittings for electrical conduit 126, which may allow electrical leads to pass through inner manway lid 128 into an inner vessel of storage tank 110 without letting any product or pressure within storage tank 110 escape (e.g., leak out of storage tank 110).

Although particular examples of inner manway lid 128, manway 146, purge pipe 122, discharge pipe 124, and electrical conduit 126 have been described, this disclosure contemplates any suitable inner manway lid 128, manway 146, purge pipe 122, discharge pipe 124, and electrical conduit 126 comprising any suitable components configured in any suitable manner, according to particular needs. In addition, inner manway lid 128, manway 146, purge pipe 122, discharge pipe 124, and electrical conduit 126 may be separate from or integral to any component of FIGS. 1-3.

Figure 4A:
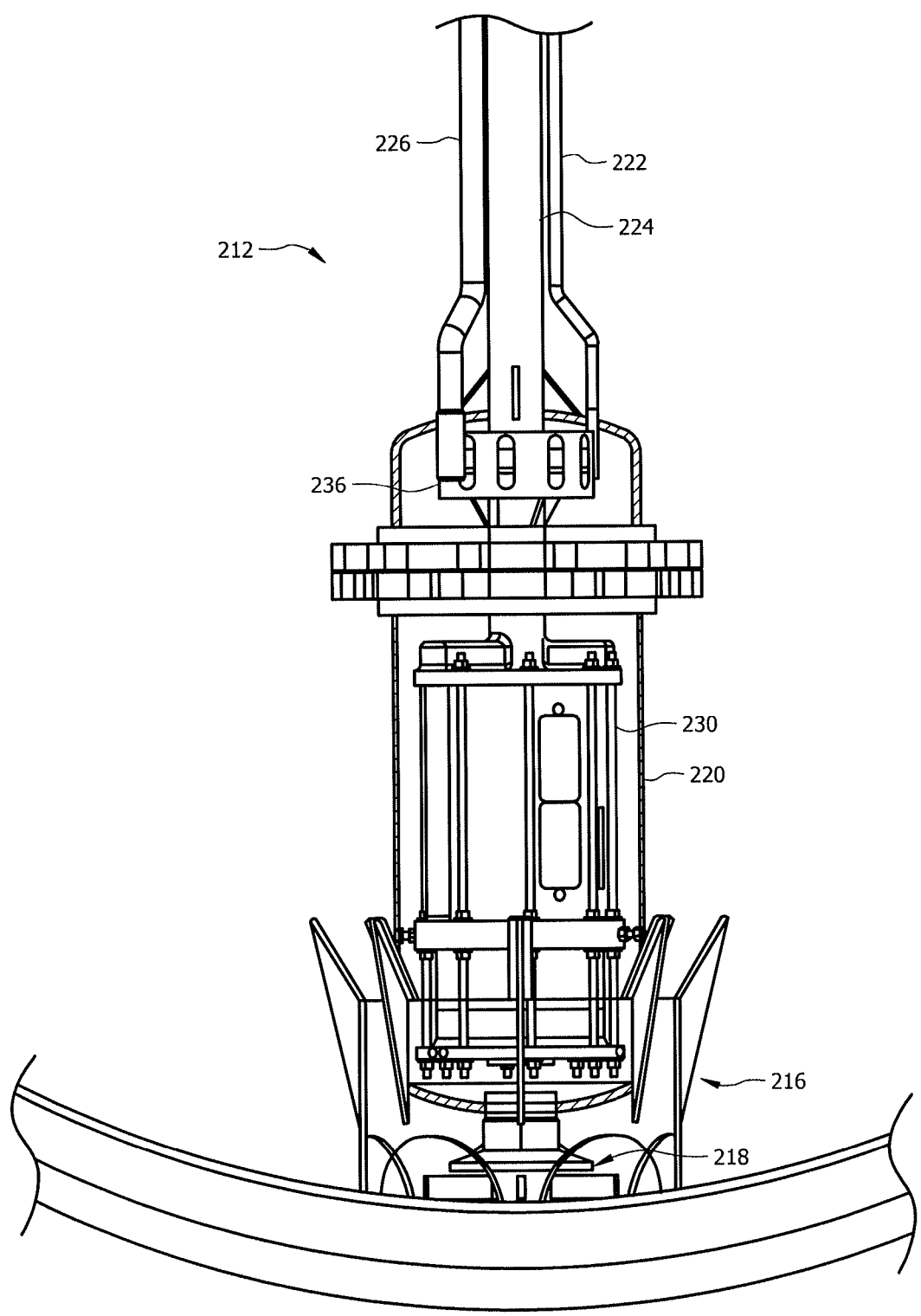
FIG. 4A illustrates a partially-transparent side view of another example pump assembly in accordance with an embodiment of the present disclosure.

FIG. 4A illustrates a partially-transparent side view of another example pump assembly in accordance with an embodiment of the present disclosure. According to the illustrated embodiment, pump assembly 212 may be held in place within storage tank 110 (of FIGS. 1-2) by crown guide 216. For example, crown guides 216 may prevent pump assembly 212 from swinging side to side like a pendulum (such as when storage tank 110 is transported over the road). In certain embodiments, crown guide 216 may be coupled to the bottom of storage tank 110. For example, crown guide 216 may be welded to a bottom interior surface of storage tank 110. The present disclosure contemplates crown guide 216 having any suitable shape and/or configuration.

In various embodiments, crown guide 216 may be used to guide pump assembly 212 into place when installing and lowering pump assembly 212 into storage tank 110. In such embodiments, crown guide 216 may include angled guide surfaces. Each angled guide surface may define an angle (e.g., from 0 degrees to 90 degrees) relative to a central axis of pump assembly 212 (which may be vertical (e.g., perpendicular to the bottom of storage tank 110), horizontal (e.g., parallel to the bottom of storage tank 110), off-set (e.g., off-set angle to the bottom of storage tank 110), etc.). Crown guide 216 also may be used as a vortex breaker (e.g., at a nozzle inlet of a liquid pump of a pump chamber).

Pump assembly 212 may include a suction nozzle 218, a pump chamber 220, a purge pipe 222, a discharge pipe 224, and an electrical conduit 226. Suction nozzle 218 may be coupled to pump chamber 220 and represents any component operable to facilitate pumping cryogenic liquid from storage tank 110. Suction nozzle 218 may be substantially similar to suction nozzle 118 of FIGS. 1-2.

Pump chamber 220 is generally suspended from a top of storage tank 110 (e.g., from an inner manway lid coupled to storage tank 110) in a vertical orientation and is configured to house a pump 230 coupled to a discharge flange 236. Pump chamber 220, pump 230, and discharge flange 236 may be substantially similar to pump chamber 120, pump 130, and discharge flange 136, respectively, of FIG. 2.

Pump chamber 220 may be coupled to purge pipe 222, discharge pipe 224, and electrical conduit 226. In certain embodiments, purge pipe 222 may be coupled to the top of pump chamber 220. In such embodiments, purge pipe 222 may also be coupled to a dip tube that extends from a top interior portion of pump chamber 220 down to a bottom interior portion of pump chamber 220 before maintenance is performed. Purge pipe 222 may be configured to drain any liquid stuck in pump chamber 220. For example, purge pipe 222 may be small tubing for purging pump chamber 220 with vapor or gas, such as nitrogen, prior to access and maintenance by a service person. In certain embodiments, purge pipe 222 may be coupled to a purge gas source operable to provide pump chamber 220 with vapor or gas (e.g., gaseous nitrogen) via purge pipe 222.

Discharge pipe 224 may be coupled to the top of pump chamber 220 and may be configured to receive cryogenic liquid pumped from storage tank 110 (e.g., liquid discharged from pump 230 (and pump 130 of FIG. 2)). Discharge pipe 224 may be substantially similar to discharge pipe 124 of FIGS. 1-3.

Electrical conduit 226 may be coupled to the top of pump chamber 220 and may be configured to provide electricity to pump 230. Electrical conduit 226 may be substantially similar to electrical conduit 126 of FIGS. 1-3.

In certain embodiments, discharge pipe 224 may extend down into the top of pump chamber 220 and couple to (e.g., be welded to) a discharge flange, such as discharge flange 236. Discharge flange 236 may be bolted to pump 230. The top half of suspended pump chamber 220 and pump 230 may be lowered into the bottom half of pump chamber 220 and rotated to thread the bottom of pump 230 (at the suction) into the bottom of pump chamber 220. The top and bottom halves of pump chamber 220 may then be sealed off at a flange, such as flange 134. A small line similar to purge pipe 222 may be teed into discharge pipe 224 above pump chamber 220. In such embodiments, cryogenic liquid discharged from pump 230 may be directed directly out of pump 230 and through the bolted discharge flange connection (e.g., at discharge flange 236) and up discharge pipe 224 to be dispensed out of storage tank 110. At least a portion of the discharged cryogenic liquid is diverted back into pump chamber 220 to fill and lubricate pump 230.

Pump assembly 212 may include any number of components of system 100 of FIG. 1 and pump assembly 112 of FIGS. 1-2. Moreover, although particular examples of pump assembly 212, crown guide 216, and purge pipe 222 have been described, the present disclosure contemplates any suitable pump assembly 212, crown guide 216, and purge pipe 222 comprising any components configured in any suitable manner, according to particular needs.

Figure 4B:
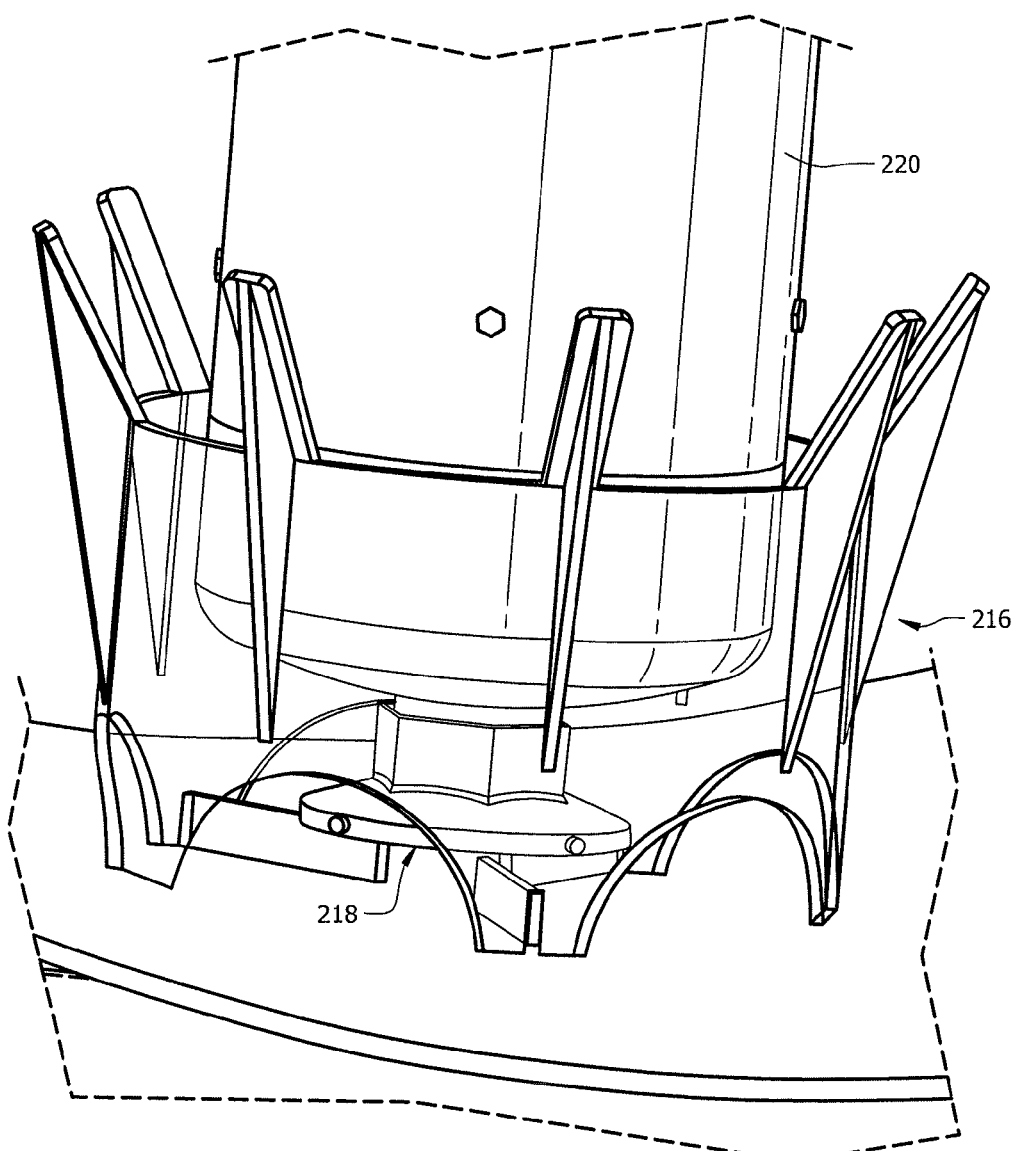
FIG. 4B illustrates a partially transparent view of an example crown guide for installing and securing an example pump chamber in accordance with an embodiment of the present disclosure.

FIG. 4B illustrates a partially transparent view of an example crown guide for installing and securing an example pump chamber in accordance with an embodiment of the present disclosure. As illustrated, a pump chamber 220 may be coupled to a suction nozzle 218. Crown guide 216 may be used to secure pump chamber 220 in place within storage tank 110 (of FIGS. 1-2). For example, crown guide 216 may be welded to a bottom surface of an inner vessel of storage tank 110 and used to hold pump chamber 220 in place, thereby preventing pump chamber 220 from swinging like a pendulum (such as when storage tank 110 is transported over the road). The present disclosure contemplates crown guide 216 having any suitable shape or configuration.

Crown guide 216 may be used as a vortex breaker (e.g., at a nozzle inlet of a liquid pump of pump chamber 220). For example, crown guide 216 may serve as a vortex breaker as cryogenic fluid is drawn into suction nozzle 218. In various embodiments, crown guide 216 also may be used to guide pump assembly 212 into place when installing and lowering pump assembly 212 into storage tank 110. In such embodiments, crown guide 216 may include angled guide surfaces. Each angled guide surface may define an angle (e.g., from 0 degrees to 90 degrees) relative to a central axis of pump assembly 212 (which may be vertical (e.g., perpendicular to the bottom of storage tank 110), horizontal (e.g., parallel to the bottom of storage tank 110), off-set (e.g., off-set angle to the bottom of storage tank 110), etc.). Although particular examples of crown guide 216 have been described, this disclosure contemplates any suitable crown guide 216 comprising any suitable components configured in any suitable manner, according to particular needs.

Figure 5:
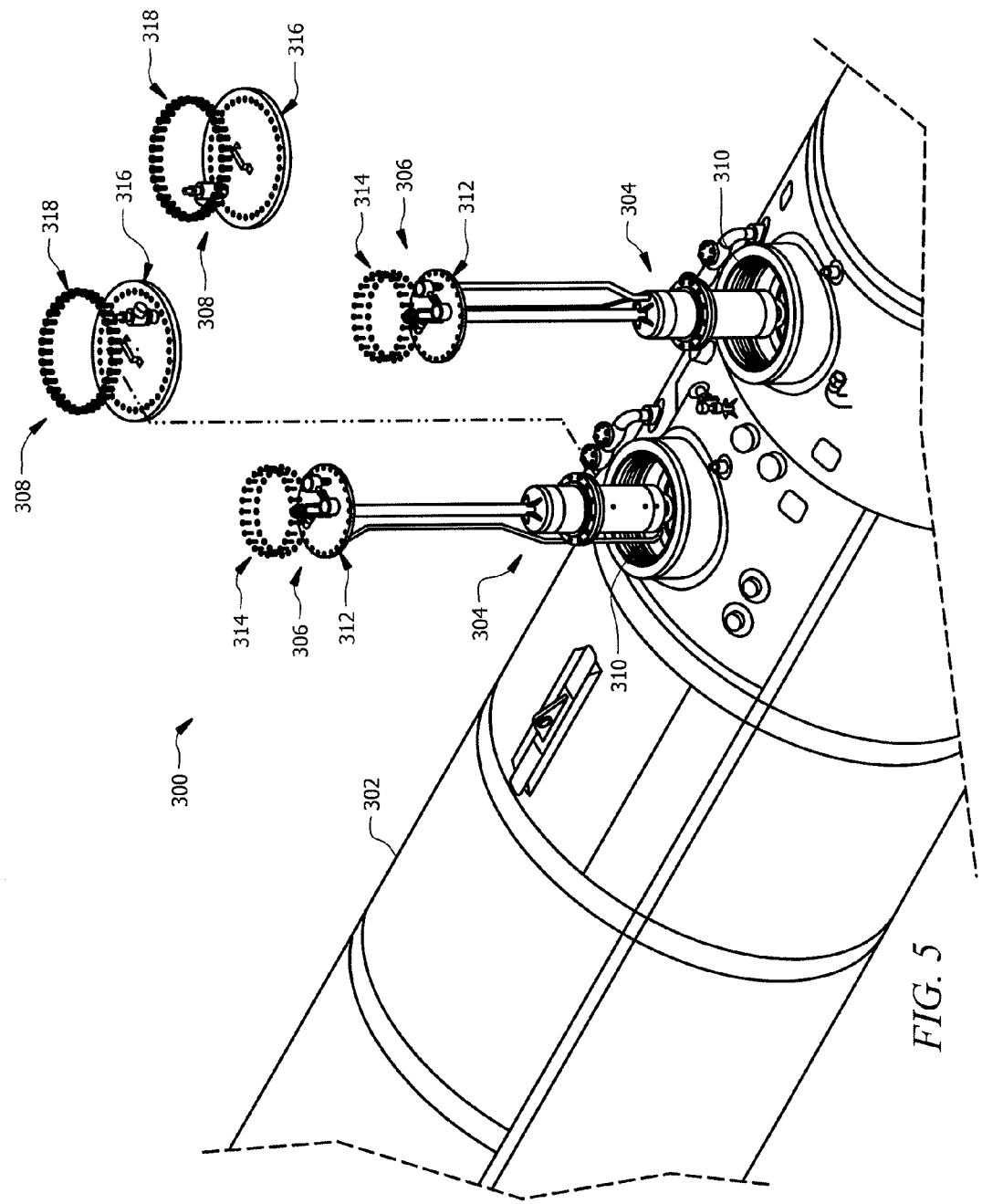
FIG. 5 illustrates an example of a dual submerged pump chamber system with dual pressure-retaining manway assemblies in accordance with an embodiment of the present disclosure.

FIG. 5 illustrates an example of a dual submerged pump chamber system with dual pressure-retaining manway assemblies in accordance with an embodiment of the present disclosure. System 300 may include a storage tank 302, pump assemblies 304, inner manway assemblies 306, outer manway assemblies 308, and manways 310. In general, system 300 utilizes one or more dual pressure-retaining manway assemblies to retain pressure within storage tank 302 and to provide a secondary pressure barrier for storage tank 302.

System 300 generally includes one or more inner manway assemblies 306 and one or more outer manway assemblies 308. Each inner manway assembly 306 (and inner manway lid 312) and each outer manway assembly 308 (and outer manway lid 316) may be configured to retain pressure within storage tank 302. In other words, an outer manway assembly 308 of system 300 may provide a secondary pressure barrier for storage tank 302. Therefore, an inner manway assembly 306 and an outer manway assembly 308 may collectively be referred to as a dual pressure-retaining manway system (and as a dual-pressure retaining manway assembly).

Each pump assembly 304 may be coupled to and suspended from an inner manway assembly 306. For example, a pump assembly 304 may be attached to a bottom surface of an inner manway lid 312 of inner manway assembly 306. In such an example, pump assembly 304 may be permanently attached to the inside of inner manway lid 312. Pump assemblies 304, inner manway assemblies 306, and inner manway lids 312 may be substantially similar to pump assembly 112, manway assembly 114, and manway lid 128, respectively, of FIGS. 1-3. Although FIG. 5 illustrates one pump assembly 304 suspended from one inner manway lid 312, the present disclosure contemplates two pump assemblies 304, three pump assemblies 304, and/or any other number of pump assemblies 304 suspended from one inner manway lid 312.

In general, pump assemblies 304 and inner manway assemblies 306 may be lowered into and installed in storage tank 302. For example, each pump assembly 304 and corresponding inner manway assembly 306 may be lowered into storage tank 302 through a manway 310 (e.g., an opening in storage tank 310). Pump assemblies 304 and inner manway assemblies 306 may then be secured within storage tank 302 using bolts 314. For example, each inner manway lid 312 may be positioned over at least a portion of a corresponding manway 310 and then coupled to an inner wall of storage tank 302 by bolts 314. The present disclosure contemplates inner manway lid 312 being coupled to storage tank 302 in any suitable manner.

After coupling inner manway lids 312 to the inner wall of storage tank 302, outer manway assemblies 308 may be secured to storage tank 302 using bolts 318. For example, each outer manway assembly 308 may include an outer manway lid 316 that may be positioned over at least a portion of a corresponding manway 310 and then coupled to an outer wall of storage tank 302 by bolts 318. The present disclosure contemplates outer manway lid 316 being coupled to storage tank 302 in any suitable manner. In general, each outer manway lid 316 is configured to provide a secondary pressure barrier for storage tank 302 and serves as an environmental barrier to keep moisture and/or humid air and dirt out. Accordingly, outer manway lid 316 (and outer manway assembly 308) in combination with inner manway lid 312 (and inner manway assembly 306) may form a dual pressure-retaining manway assembly. Although particular examples of a dual pressure-retaining manway assembly have been described, this disclosure contemplates any suitable dual pressure-retaining assembly comprising any suitable components configured in any suitable manner, according to particular needs.

In certain embodiments, insulation is installed between inner manway assemblies 306 and outer manway assemblies 308. Moreover, inner manway lid 312 may be coupled to an interior wall of storage tank 302 with a gasket therebetween and/or outer manway lid 316 may be coupled to an exterior wall of storage tank 302 with a gasket therebetween (e.g., inner and outer manway lids are installed with gaskets before the corresponding bolts are torqued down). In certain embodiments, in the event of a leak or failure of inner manway lid 312 (e.g., a leak or failure of a gasket associated with inner manway lid 312), a low compression force, single, centered, spring-loaded, small lift plate opening in an outer manway lid (not shown), such as outer manway lid 316, may allow any leakage to exit manway 310 (e.g., the inner bellows space of a manway between an inner manway lid and an outer manway lid).

Although FIG. 5 illustrates system 300 as including one storage tank 302, two pump assemblies 304, two inner manway assemblies 306, and two outer manway assemblies 308, in various embodiments, system 300 may include any number of storage tanks 302, pump assemblies 304, inner manway assemblies 306, outer manway assemblies 308, and any other suitable components. Furthermore, any component of system 300 may be separate from or integral to any component of FIG. 5. In addition, system 300 may include any number of components of system 100 of FIG. 1 and/or system 200 of FIGS. 4A-4B.

Figure 6:
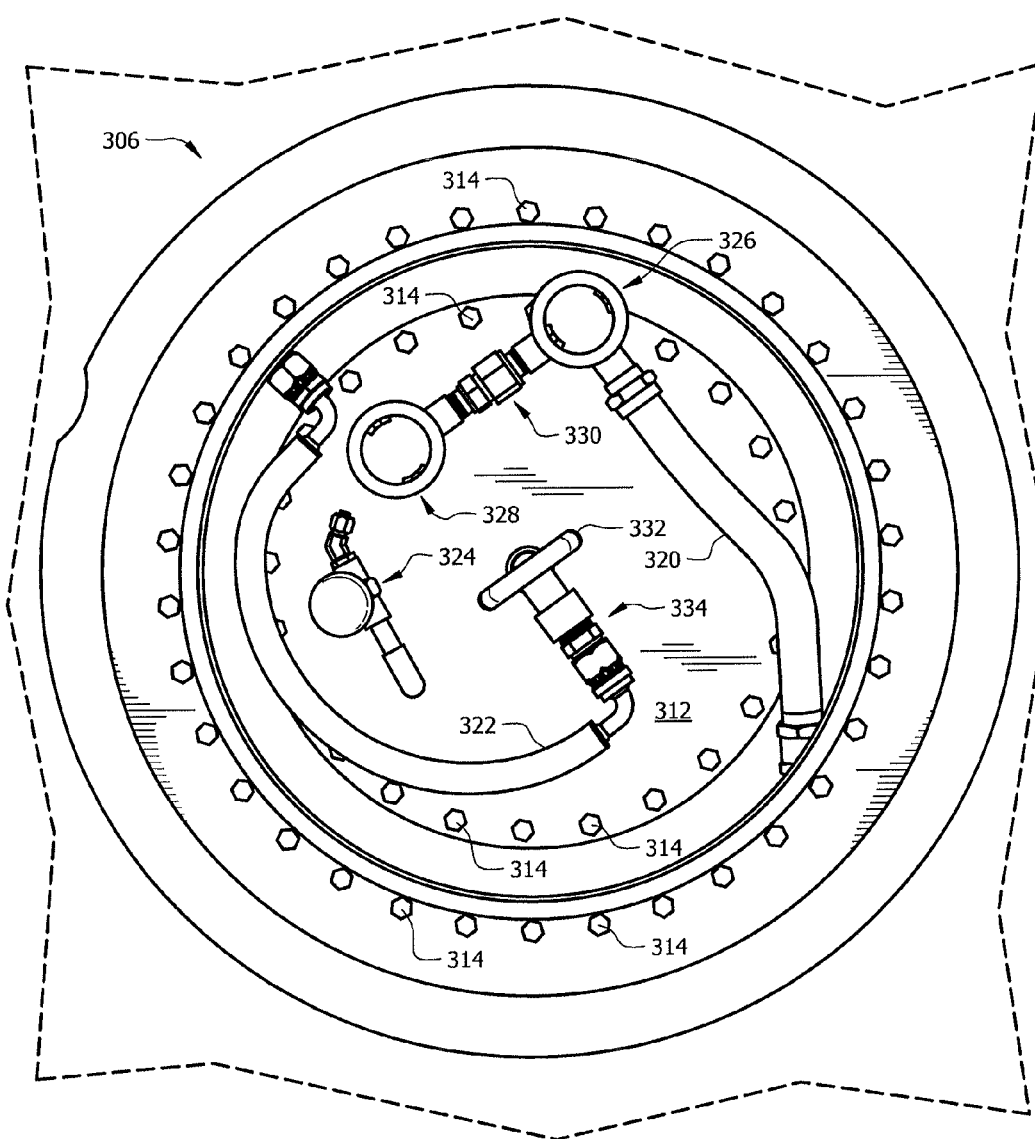
FIG. 6 illustrates a top outer view of an example inner manway assembly in accordance with an embodiment of the present disclosure.

FIG. 6 illustrates a top outer view of an example inner manway assembly in accordance with an embodiment of the present disclosure. An inner manway assembly 306 may include an inner manway lid 312 coupled to an inner wall of a storage tank (such as storage tank 110 of FIG. 1 and/or storage tank 302 of FIG. 5) by bolts 314. Inner manway lid 312 is generally configured to retain pressure within a storage tank and may be disposed over at least a portion of a manway (such as manway 310 of FIG. 5) formed in a body of the storage tank.

Valves, fittings, and other components may be mounted on inner manway lid 312. In an example embodiment, an electrical flex conduit 320, a discharge flex hose 322, and a purge valve 324 may be mounted to a top surface of inner manway lid 312. Electrical flex conduit 320 may be used to enclose, route, and protect electrical wires in a storage tank (such as storage tank 110 and storage tank 302). In certain embodiments, electrical flex conduit 320 may be coupled to dual (in-series for redundancy) electrical pass-through fittings and condolet connections, such as a condolet 326 and a condolet 328.

In certain embodiments, electrical flex conduit 320 may refer to a flexible hollow tube made from any suitable material and/or combination of materials. In alternative embodiments, electrical flex conduit 320 may be piping/tubing, such as a rigid hollow tube, made from stainless steel, any other suitable material, and/or any combination of materials. As such, electrical flex conduit 320 may be referred to as an electrical conduit 320. Additionally, in such embodiments, electrical flex conduit 320 may include or otherwise be coupled to compression fittings.

Condolets 326 and 328 may facilitate the routing of electrical wires. Condolets 326 and 328 may be coupled to each other by a pressure pass-through fitting 330 and may be configured to block pressure from within a storage tank. In certain embodiments, condolets 326 and 328 may be electrical fittings designed to retain pressure and/or may be an explosion-proof junction box. In certain embodiments, an opening in inner manway lid 312 may be used to communicatively couple condolet 328 to electrical conduit 126 (of FIGS. 1-3), and thereby provide pump 130 (of FIG. 2) with electricity. For example, electrical wiring from pump 130 may extend up through pump chamber 120 (of FIGS. 1-2), electrical conduit 126, and then through the bottom inside surface of inner manway lid 312 into a pressure pass-through electrical fitting mounted to the top outside surface of inner manway lid 312 (e.g., condolet 328). In such an example, a secondary in-line (in-series) and/or backup pass-through located outside of inner manway lid 312 (e.g., condolet 326) also may be used. Alternatively, new dual in-series pressure-retaining pass throughs in a single fitting may be used. Accordingly, high voltage—such as 480 volt, 3-phase power—may exit storage tank 302 through inner manway lid 312 via a cryogenic rated pressure-pass through fitting located directly under (and also screwed into) round condolet 326 and then through condolet 328. The electricity may then come into storage tank 302 through electrical flex conduit 320, into condolet 326, pass through condolet 326 and into condolet 328 via the second, redundant electrical pressure pass-through fitting, and then down into pump chamber 120 via electrical conduit 126. In particular embodiments, the electrical wiring may be disconnected and/or connected at condolet junctions (e.g., condolet 326) plumbed in conjunction with the pass through fittings.

Discharge flex hose 322 generally facilitates the removal of cryogenic liquid from storage tank 302 (and storage tank 110 of FIG. 1). Discharge flex hose 322 may be attached to the outside of inner manway lid 312. In certain embodiments, a first end of discharge flex hose 322 may be coupled to discharge pipe 124 (of FIGS. 1-3) by a pump discharge port 334 (with a pressure pass-through fitting). As such, pump discharge flow (e.g., cryogenic liquid pumped from storage tank 302) may exit up and through the center of inner manway lid 312 via discharge pipe 124 and into discharge flex hose 322. Thus, discharge flex hose 322 may receive and contain pump discharge flow and pressure from pump 130. As illustrated in FIG. 6, discharge flex hose 322 is connected to an outlet on the top center of inner manway lid 312 (which has an elbow and a fitting to which discharge flex hose 322 is connected).

In certain embodiments, a second end of discharge flex hose 322 may be coupled to a port on a line that extends through a vacuum jacket of storage tank 302 (e.g., between an inner vessel and an outer vessel of a cryogenic storage tank) to an appropriate and/or convenient location outside of the vacuum jacket (e.g., to a location where valves and standard piping circuits are employed). For example, a second end of discharge flex hose 322 may be coupled to a pipe in an annulus (e.g., vacuum space) of storage tank 302 by an inset or recess area (not shown). The pipe may extend through the vacuum space of storage tank 302 (e.g., between the inner and outer vessels of a cryogenic storage tank) and out of storage tank 302 at an appropriate location (which may be outside of storage tank 302). In such embodiments, cryogenic liquid may flow through discharge flex hose 322 and into the pipe to exit storage tank 302. In certain embodiments, discharge flex hose 322 may have a diameter of approximately one inch or any other suitable diameter (based on the size and capacity of the pump installed).

In certain embodiments, discharge flex hose 322 may be a flexible hollow tube made from any suitable material and/or combination of materials. In alternative embodiments, discharge flex hose 322 may be piping/tubing, such as a rigid hollow tube, made from stainless steel, any other suitable material, and/or any combination of materials. As such, discharge flex hose 322 may be referred to as a discharge hose 322, a discharge tube 322, etc. Additionally, in such embodiments, discharge hose 322 may include or otherwise be coupled to compression fittings.

Purge valve 324 generally facilitates draining and purging pump chamber 120 and storage tank 302 (and/or storage tank 110 of FIG. 1). Purge valve 324 may be a non-extended stem globe valve and may be attached to the outside surface of inner manway lid 312. In certain embodiments, purge valve 324 may be coupled to purge pipe 122 (of FIGS. 1-3), which may be a half-inch stainless steel tubing line. For example, purge valve 324 may be coupled to a first end of a purge pipe 122 that extends from the bottom (e.g., inner) surface inner manway lid 312 down to the top of pump chamber 120, and a second end of purge pipe 122 may be coupled to a dip tube that extends down along the side of pump 130 to the bottom of pump chamber 120. In such an example, purging the line may cause any remaining cryogenic liquid in pump chamber 120 to boil and bubble out through pump 130 and suction nozzle 118 (of FIGS. 1-2) and/or out through discharge pipe 124. As another example, purge valve 324 may be coupled to a first end of a purge pipe 122 that runs down the outside of pump chamber 120 and enters pump chamber 120 through a bottom surface of pump chamber 120 (e.g., purge pipe 122 is not coupled to a dip tube). In such an example, any cryogenic liquid trapped within pump chamber 120 may be "drained" from pump chamber 120 (any pressure in the storage tank will be communicated up through the suction nozzle of pump 130, pressurizing the area within pump chamber 120, pushing any liquid out of purge pipe 122 when purge valve 324 is opened). In certain embodiments, pump chamber 120 may be purged when, for example, nitrogen vapor (or any other suitable gas or vapor source), is connected to a valve port of purge valve 324 on the outside of inner manway lid 312.

Purge valve 324 may serve as an important safety feature of system 300, in certain embodiments. For example, to reduce and/or eliminate the risk associated with removing an inner manway lid 312 from a storage tank 302 (e.g., the risk of an inner manway lid blowing off a storage tank when the bolts are removed because the storage tank is pressurized), a service person performing pump maintenance may open purge valve 324 to verify that storage tank 302 is not pressurized (e.g., there is no pressure on inner manway lid 312 other than a slight nitrogen vapor purge when the storage tank is in flammable gas service) before removing inner manway lid 312. In such an example, inner manway bolts 314 may be safely removed if storage tank 302 is not pressurized. If storage tank 302 is pressurized, inner manway bolts 314 may not be safely removed until storage tank 302 is vented down to zero and has a slight positive pressure purge. In certain embodiments, a slight positive pressure may refer to a whisper flow to keep humid ambient air from entering storage tank 302 when inner manway lid 312 is removed. In such embodiments, pressure may be anything more than a whisper, e.g., if a storage tank is still pressurized from service, it must be vented to near zero PSI before inner manway lid 312 can be removed, certainly less than half a PSI. For example, a 16" diameter manway lid has a surface area within the inside of the pressurized tank of over 200 square inches. At 1 PSI, that is 200 pounds of force reacting and/or pushing again the bottom of inner manway lid 312; enough to likely lift up the manway lift. At 10 PSI, that is 2000 pounds of lifting force, enough to cause inner manway lid 312 to dangerously be blown off.

In certain embodiments, inner manway assembly 306 may include a lifting eye 332. For example, a lifting eye 332 may be coupled to a top surface of inner manway lid 312. Lifting eye 332 generally may be used to install and remove pump assembly 304 and inner manway assembly 306 from storage tank 302. For example, a crane may attach to lifting eye 332 to lower pump assembly 304 and inner manway assembly 306 into storage tank 302. As another example, a crane may attach to lifting eye 332 to lift pump assembly 304 and inner manway assembly 306 from storage tank 302. In certain embodiments, before lifting pump assembly 304 and inner manway assembly 306 from storage tank 302, (1) electrical flex conduit 320 (through which high voltage electrical wiring passes) and discharge flex hose 322 may be removed or otherwise disconnected; and/or (2) purge valve 324 may be used to drain and/or purge pump chamber 120. In various embodiments, inset cups (not shown) may be incorporated into the sides of a bellows chamber (discussed in more detail below) to provide room for fittings on the ends of discharge flex hose 322 and electrical flex conduit 320 to be connected and disconnected with a wrench (the inset cups provide space to accommodate the wrench) at appropriate locations when installing and/or removing inner manway lid 312. In certain embodiments, fiberglass insulation may be secured around electrical flex conduit 320 and discharge flex hose 322.

Although particular examples of inner manway assembly 306 have been described, the present disclosure contemplates any suitable inner manway assembly 306 comprising any suitable components configured in any suitable manner, according to particular needs. Moreover, any component of inner manway assembly 306 may be separate from or integral to any component of FIG. 6.

Figure 7A:
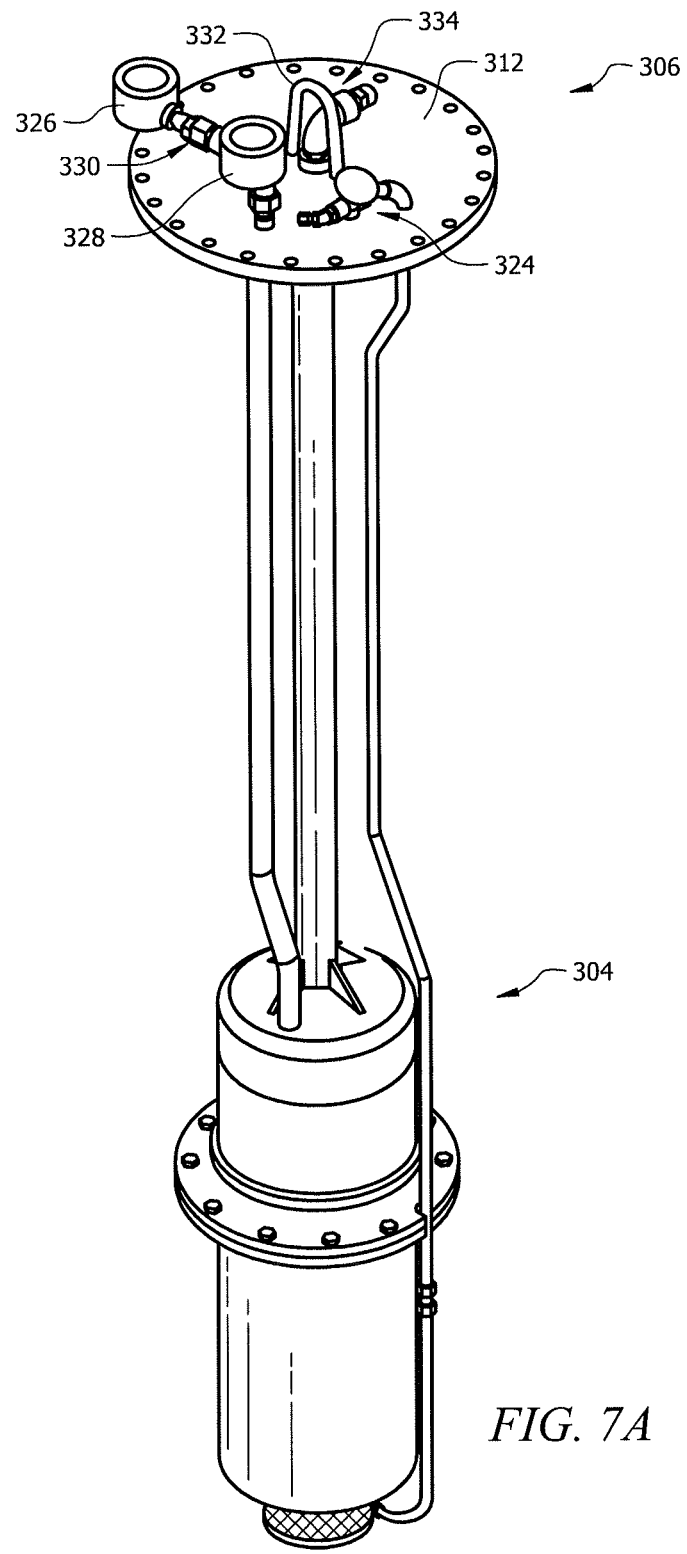
FIG. 7A illustrates a perspective view of an example pump assembly suspended from an example inner manway assembly in accordance with an embodiment of the present disclosure.
Figure 7B:
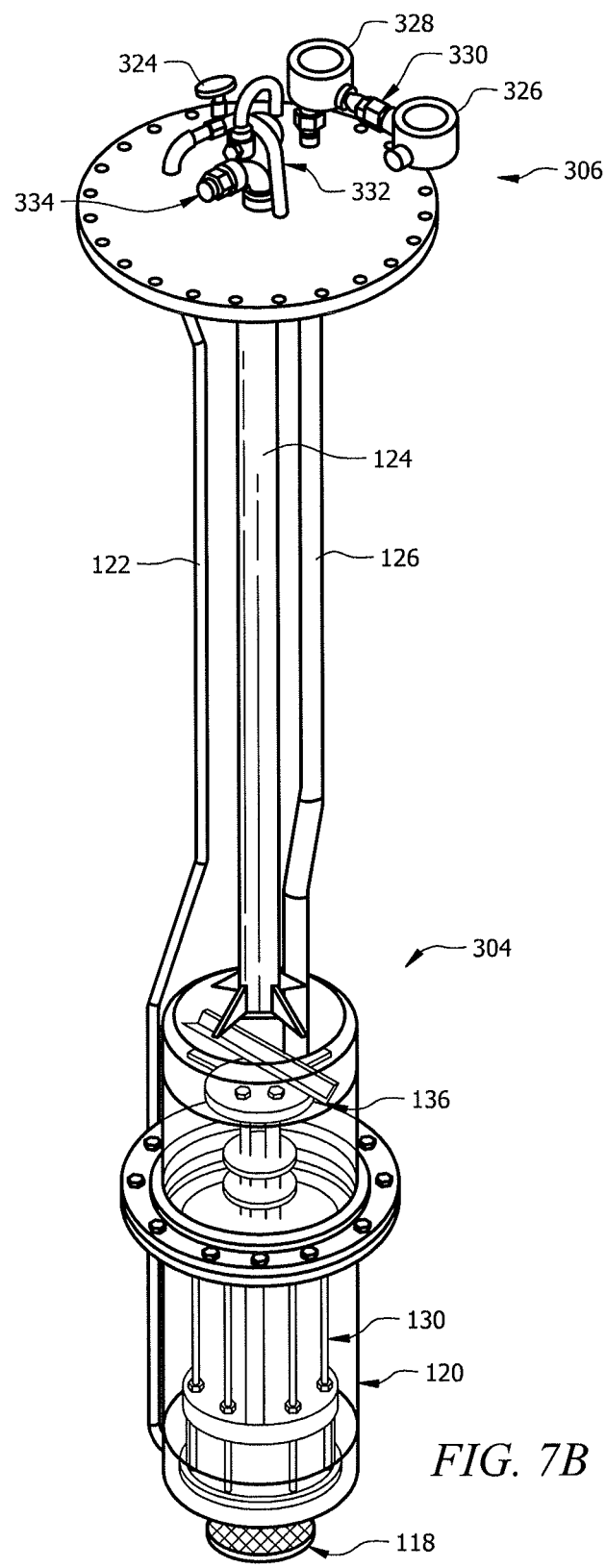
FIG. 7B illustrates a partially-transparent perspective view of an example pump assembly suspended from an example inner manway assembly in accordance with an embodiment of the present disclosure.

FIGS. 7A through 7B illustrate a perspective view and a partially-transparent perspective view of an example pump assembly suspended from an example inner manway assembly in accordance with an embodiment of the present disclosure. As illustrated, pump assembly 304 may be suspended vertically from inner manway assembly 306. Pump assembly 304 and inner manway assembly 306 may be substantially similar to pump assembly 112 and manway assembly 114, respectively, of FIGS. 1-3.

As described above with reference to FIGS. 1-3, pump assembly 304 (and pump assembly 112) may include a pump chamber 120 coupled to a suction nozzle 118, purge pipe 122, discharge pipe 124, and electrical conduit 126. In general, pump chamber 120 is suspended vertically from a bottom surface of inner manway lid 312 (and inner manway lid 128) of inner manway assembly 306 (and inner manway assembly 114) and houses a pump 130 and discharge flange 136.

Inner manway assembly 306 generally includes inner manway lid 312. As illustrated in FIG. 7B, a purge valve 324, electrical condolets 326 and 328 coupled together by a pressure pass-through fitting 330, a lifting eye 332, and a pump discharge port 334 may be mounted on a top surface of inner manway lid 312. In certain embodiments, electrical condolets 326 and 328 may include cryogenic pass-through electrical fittings. In certain embodiments, an operator of a crane may use lifting eye 332 to lift pump assembly 304 via inner manway assembly 306.

In the illustrated embodiment, purge pipe 122 extends from a bottom surface of inner manway lid 312 (e.g., at a location where purge pipe 122 couples to purge valve 324 via an opening in inner manway lid 312), to the bottom of pump chamber 120. Alternatively, purge pipe 122 may extend from a bottom surface of inner manway lid 312 to the top of pump chamber 120 (e.g., at a location where a dip tube may be dropped down the inside of pump chamber 120, to one side of pump 130, and to the bottom of pump chamber 120).

In certain embodiments, discharge pipe 124 may be a large diameter pipe used to suspend pump chamber 120 from the inside (e.g., a bottom surface) of inner manway lid 312 and keep suction nozzle 118 at a minimum required distance from the bottom of storage tank 302 (and storage tank 110 of FIG. 1). During pumping operations, discharge pipe 124 facilitates removing cryogenic liquid from storage tank 302. For example, after pump chamber 120 is at least partially filled with cryogenic liquid submerging pump 130, discharged cryogenic liquid may be directed up through discharge pipe 124 and out the top center of inner manway lid 312.

An example pump 130 may include a 2½" male threaded nipple on a bottom surface (as discussed above). In embodiments where pump chamber 120 is separated into two halves (e.g., a top portion and a bottom portion) at a flanged joint, pump 130 may be "screwed" into a threaded 2½" female coupling welded to a bottom surface of the bottom portion of pump chamber 120. Suction nozzle 118 may be screwed into a threaded male nipple welded to a bottom exterior surface of the bottom portion of pump chamber 120, and centered over an opening in the bottom portion of pump chamber 120 such that cryogenic liquid from storage tank 302 may enter pump 130. In such embodiments, electrical wiring may be connected and secured when the top and bottom portions of pump chamber 120 are a few inches apart. Subsequently, the top and bottom portions of pump chamber 120 may be connected at the flange joint with a gasket and secured with bolts.

In certain embodiments, a pump 130 may be a self-cooling, self-lubricating pump. In such embodiments, pump 130 (not housed within a pump chamber) may be suspended from the inside of inner manway lid 312 using a discharge pipe with a flange, which may be mated to discharge flange 136.

In certain embodiments, discharge pipe 124 may not be in liquid communication with pump chamber 120 and/or pump 130 (e.g., discharge pipe 124 may not be configured to receive cryogenic liquid pumped from storage tank 302). For example, discharge pipe 124 may be used to suspend a pump 130 and/or a pump chamber 120 from a top of a storage tank 302 (e.g., from the bottom of a manway lid of a storage tank). A discharge line may extend from outside of storage tank 302 to inside of storage tank 302 via an inlet/port of storage tank 302 and may be configured to receive cryogenic liquid pumped from storage tank 302 (e.g., liquid discharged from a pump 130 within storage tank 302). In such an example, the discharge line inside of storage tank 302 may be coupled to a flex hose that may be attached to a port on a lower portion of pump chamber 120 (and/or coupled to pump 130). Accordingly, cryogenic liquid may be discharged from storage tank 302 via the flex house and discharge line. Moreover, in such embodiments, pump assembly 304 may be removed (e.g., for maintenance) by (1)

disconnecting electrical connections on inner manway lid 312; (2) lifting inner manway lid 312 to remove pump assembly from within storage tank 302; and (3) once pump assembly 304 is outside of storage tank 302, disconnecting the flex hose and/or discharge line, and, for example, tying the flex hose and/or discharge line to the top of storage tank 302 to prevent the flex hose and/or discharge line from falling back down into storage tank 302. To reinstall the pump or install a new pump, the flex hose and/or discharge line may be connected to the pump and/or pump chamber before lowering pump assembly 304 into storage tank 302, connecting electrical connections on inner manway lid 312, and torqueing bolts 314.

Although particular examples of pump assembly 304 and inner manway assembly 306 have been described with reference to FIGS. 7A-7B, the present disclosure contemplates any suitable pump assembly 304 and inner manway assembly 306 comprising any suitable components configured in any suitable manner, according to particular needs. Moreover, any component of pump assembly 304 and inner manway assembly 306 may be separate from or integral to any component of FIGS. 7A-7B.

Figure 8:
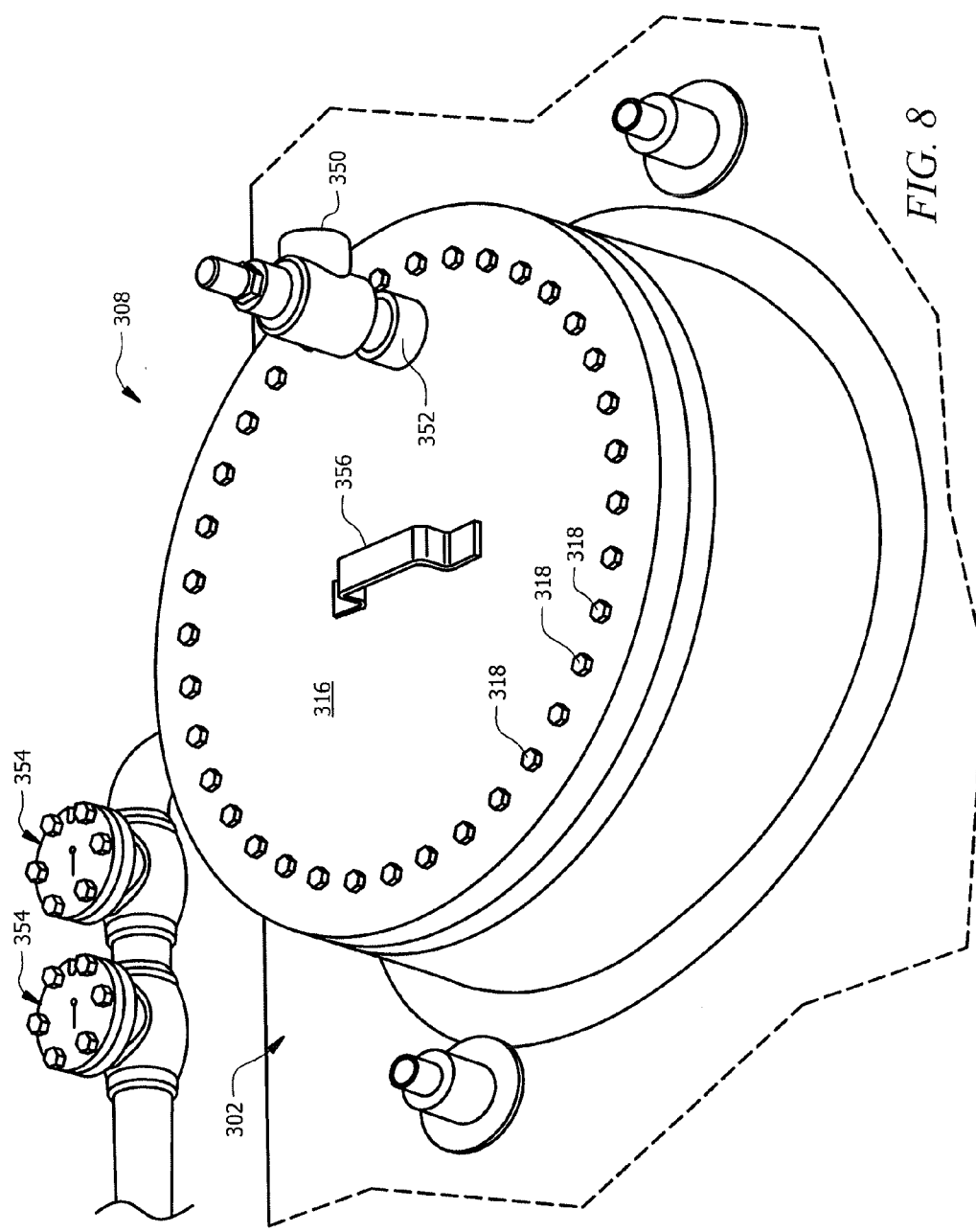
FIG. 8 illustrates an example outer manway assembly in accordance with an embodiment of the present disclosure.

FIG. 8 illustrates an example outer manway assembly in accordance with an embodiment of the present disclosure. An outer manway assembly 308 may include an outer manway lid 316 that may be coupled to an outer wall of storage tank 302 and disposed over at least a portion of a manway. Outer manway lid 316 is generally configured to retain pressure within storage tank 302 (and storage tank 110 of FIG. 1). For example, outer manway lid 316 may be able to withstand the maximum allowable working pressure (e.g., a pressure at which a primary relief valve on the inner vessel and/or inner manway lid 312 opens) of storage tank 302. Thus, outer manway lid 316 may retain and relieve pressure, thereby serving as a back-up containment system. Such a feature may be very attractive for flammable cryogenic fluids such as liquefied natural gas ("LNG"). For example, in the case of a vapor leak (i.e., an inner manway lid gasket leak and/or a pump discharge flex hose leak), outer manway lid 316 may contain the leak.

In certain embodiments, outer manway lid 316 may keep humid air and any associated build-up out of a manway 310 (e.g., a void between inner manway lid 312 and outer manway lid 316). In such embodiments, manway 310 may be super insulated to reflect radiation and to limit the heat leak into storage tank 302 and/or outer manway lid 316 may not be designed to retain pressure.

Outer manway lid 316 may be coupled to an outer wall of storage tank 302 by bolts 318. Bolts 318 may be standard stainless steel bolts. As such, outer manway lid 316 may be able to retain the rated pressure of inner manway lid 312 and an external pressure relief valve may be coupled to outer manway lid 316 and configured to relieve pressure from flash gas created by a hose breaking within the two manway lids (which would be heated from the ambient temperature of the outer manway and quickly expand to vapor and otherwise over-pressurize the manway void area).

In certain embodiments, bolts 318 may be spring-loaded bolts (additional details described below with regard to FIG. 9). In such embodiments, bolts 318 may allow outer manway lid 316 to lift up to relieve excess pressure within storage tank 302 (e.g., pressure between inner manway lid 312 and outer manway lid 316) in the event of a vapor leak. For example, should a discharge flex hose 320 or inner manway lid 312 ever leak, the entire outer manway lid 316 may lift off of the spring-loaded bolts 318 holding it in place to safely release gas into the atmosphere. In certain embodiments, the surface area is so large that even with the weight of outer manway lid 316 and ten pound springs on, for example, twenty four bolts 318, less than one PSI may lift outer manway lid 318. Although FIG. 8 illustrates outer manway assembly 308 as including twenty four bolts 318, outer manway assembly 308 may include any number of bolts 318.

Outer manway assembly 308 may also include a relief valve 350, in certain embodiments. Relief valve 350 may be coupled to outer manway lid 316 by a threaded female half coupling 352. For example, relief valve 350 may be screwed into a threaded female half coupling 352 on a top exterior surface of outer manway lid 316. The present disclosure contemplates relief valve 350 being coupled to outer manway lid 316 by any other suitable components and/or in any suitable manner.

Relief valve 350 may be configured to open in certain circumstances, such as if cryogenic liquid were to leak inside a manway cavity (between inner manway lid 312 and outer manway lid 316) and flash into vapor. For example, if a discharge flex hose breaks while pump 130 (of FIG. 2) is pumping cryogenic liquid from storage tank 302, cryogenic liquid may contact warm metal bellows in the manway area (e.g., between inner manway lid 312 and outer manway lid 316), and/or outer manway lid 316, and flash into vapor (even if there are safety shut down features for pump 130, cryogenic liquid may still be pumped into the space between inner manway lid 312 and outer manway lid 316 several seconds after pump 130 begins shutting down). As a result, the sealed area between inner manway lid 312 and outer manway lid 316 may over-pressurize, as the now greater quantity of flashing vapor cannot all be pushed back down fast enough through the discharge flex hose from which it exited the inner vessel of storage tank 302 as cryogenic liquid. In such an example, relief valve 350 may open to release the pressure by venting the flashing vapor into the atmosphere. In certain embodiments, if a leak between inner manway lid 312 and outer manway lid 316 is not the result of a break in a discharge flex hose, outer manway lid 316 may contain the leak and relief valve 350 would not open (e.g., outer manway lid 316 contains an inner manway lid gasket leak).

Outer manway assembly 308 may include conduits 354 and a handle 356 coupled to the top of outer manway lid 316. Conduits 354 may be two check valves in series on a vent line from storage tank 302. Handle 356 may be used to lift and remove outer manway lid 316 (e.g., a crane can be attached to handle 356 and/or a person may grab handle 356 to slide outer manway lid 316). In certain embodiments, outer manway assembly 308 includes a check valve. In certain embodiments, outer manway assembly 308 may also include a tee in the line, for example, between outer manway lid 316 and relief valve 350 a line with a check valve in it (to prevent humid air from entering the manway area) is ran to, and directed directly underneath a methane detector (e.g., when storage tank 302 is used in LNG service).

A check valve may be a low-cracking pressure-check valve and may be coupled to a top exterior surface of outer manway lid 316. The check valve also may be coupled to a first end of a tubing line. A second end of the tubing line may be coupled to a gas detector. For example, a small diameter tubing line may run from the manway area (e.g., from a check valve over a port in outer manway lid 316) and directly underneath a flammable gas detector configured to alarm and stop system 100 (of FIG. 1) and/or system 300 (of FIG. 5) should a leak occur within manway 310. In such embodiments, the tubing line may be configured to direct any leakage from manway 310 to the flammable gas detector. Thus, system 100 and/or system 300 may include an alarm system operable to detect a leak within a manway and in response to detecting a leak, communicate a warning and/or activate safety shutdown features that may safely shutdown a control system of storage tank 302 (and storage tank 110 of FIG. 1). By including these features, the appropriate person and/or user may be notified of a leak via a flammable gas detector alarm (even if the leak is a small inner manway leak). Moreover, a check valve on the small line to the flammable gas detector may prevent humid air from entering into the insulated (fiberglass and super insulation) space between the two manway lids, thereby preventing any humid air from causing ice to build up inside the space between the manway lids.

Particular embodiments of the present disclosure may employ bellows (described in more detail below with reference to FIG. 10A) and/or an outer manway lid 316 that may accommodate the storage tank maximum allowable working pressure ("MAWP"), in addition to relief valve 350 (to vent initial flash gas caused by a leak within storage tank 302).

In certain embodiments, outer manway lid 316 may include a small port, bleed valve, and pressure gauge. The pressure gauge may be mounted on the outer manway lid to show if the void between the two manway lids is pressurized before attempting to remove the outer manway lid. In such embodiments, a service person or other personnel may determine whether there is any pressure below outer manway lid 316 before removing it. If there is pressure below outer manway lid 316, the service person may bleed (e.g., release) the pressure beneath outer manway lid 316 prior to safely removing outer manway lid 316.

Although particular examples of outer manway assembly 308 and outer manway 406 have been described, the present disclosure contemplates any suitable outer manway assembly 308 and outer manway 406 comprising any suitable components configured in any suitable manner, according to particular needs. Moreover, any component of outer manway assembly 308 may be separate from or integral to any component of FIG. 8.

Figure 9:
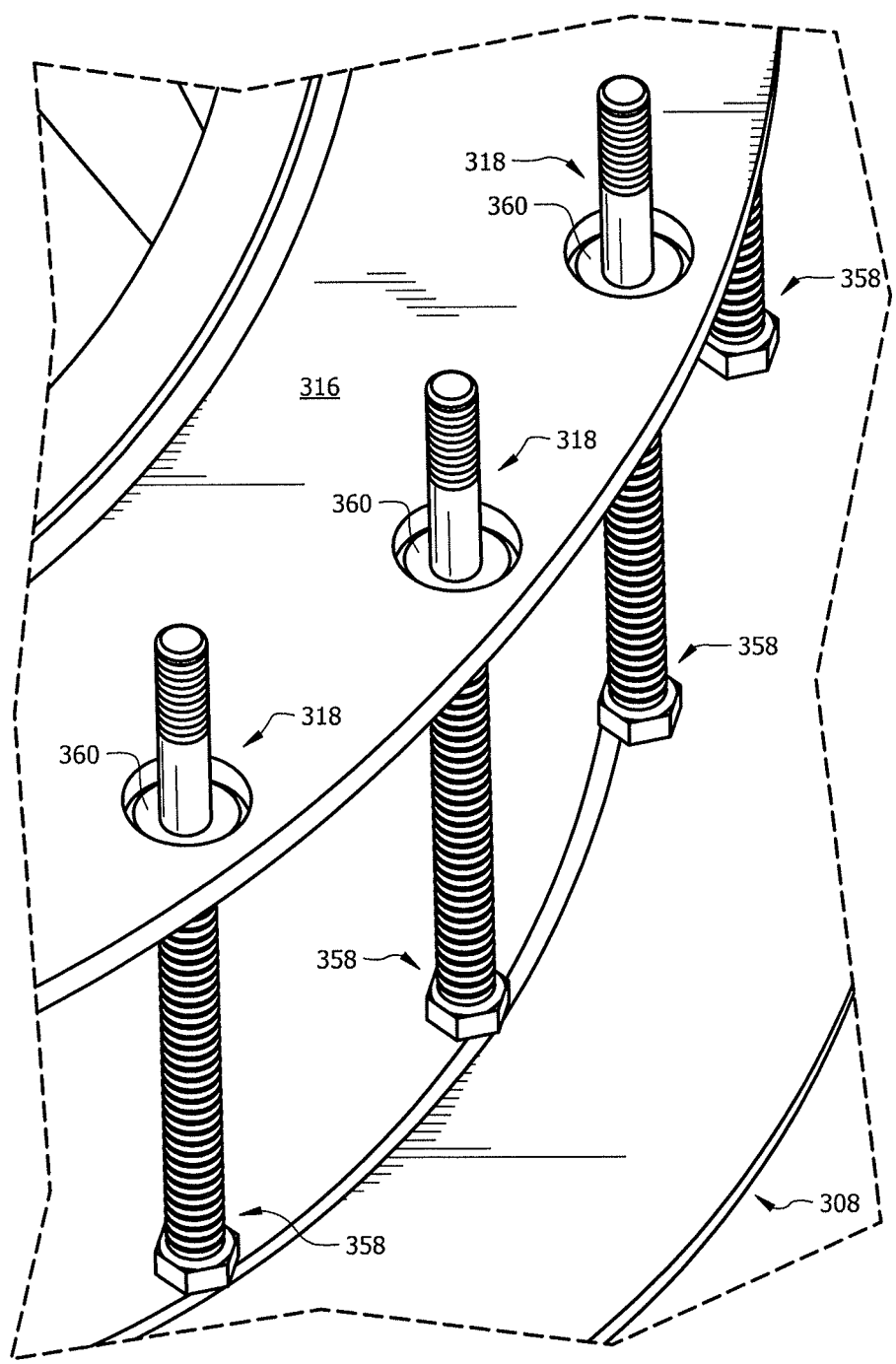
FIG. 9 illustrates an example outer manway lid secured to a storage tank by spring-loaded bolts in accordance with an embodiment of the present disclosure.

FIG. 9 illustrates an example outer manway lid secured to a storage tank by spring-loaded bolts in accordance with an embodiment of the present disclosure. As described above, outer manway lid 316 is generally secured to an outer wall of storage tank 302 via long spring-loaded bolts 318 and configured to open when pressure within storage tank 302 exceeds a threshold. The pressure threshold may be a function of spring strength, number of springs, and the surface area of outer manway lid 316 exposed to pressure and may be set such that outer manway lid 316 lifts up to relieve pressure before the bellows and/or manway lids are damaged. Bolts 318 may serve to allow the entire outer manway lid 316 to rise up to relieve pressure, and then reseat, and each bolt 318 may include a spring 358 and a washer 360.

According to the illustrated embodiment, flat washers, such as washers 360 on long smooth-shoulder bolts, such as bolts 318, with springs 358 may permit bolts 318 to act as spring-load studs to (1) hold outer manway lid 316 firmly in place (to provide an environmental seal to keep humidity out), and (2) allow the entire outer manway lid 316 to lift up several inches to vent any pressure that may leak into manway 310. For example, if an inner manway gasket and/or pump discharge hose connected to (or otherwise associated with) inner manway lid 312 were to leak, pressure within storage tank 302 (e.g., between inner and outer manway lids) may cause outer manway lid 316 to lift up to relieve the pressure, and then to reseat itself. In certain embodiments, an O-ring (or gasket) may provide a seal to keep out moisture.

Although particular examples of outer manway lid 316, bolts 318, springs 358, and washers 360 have been described, this disclosure contemplates any suitable outer manway lid 316, bolts 318, springs 358, and washers 360 configured in any suitable manner, according to particular needs. Moreover, outer manway lid 316 may be coupled to storage tank 302 using any number of bolts 318, springs 358, washers 360, and/or any other suitable components.

Figure 10A:
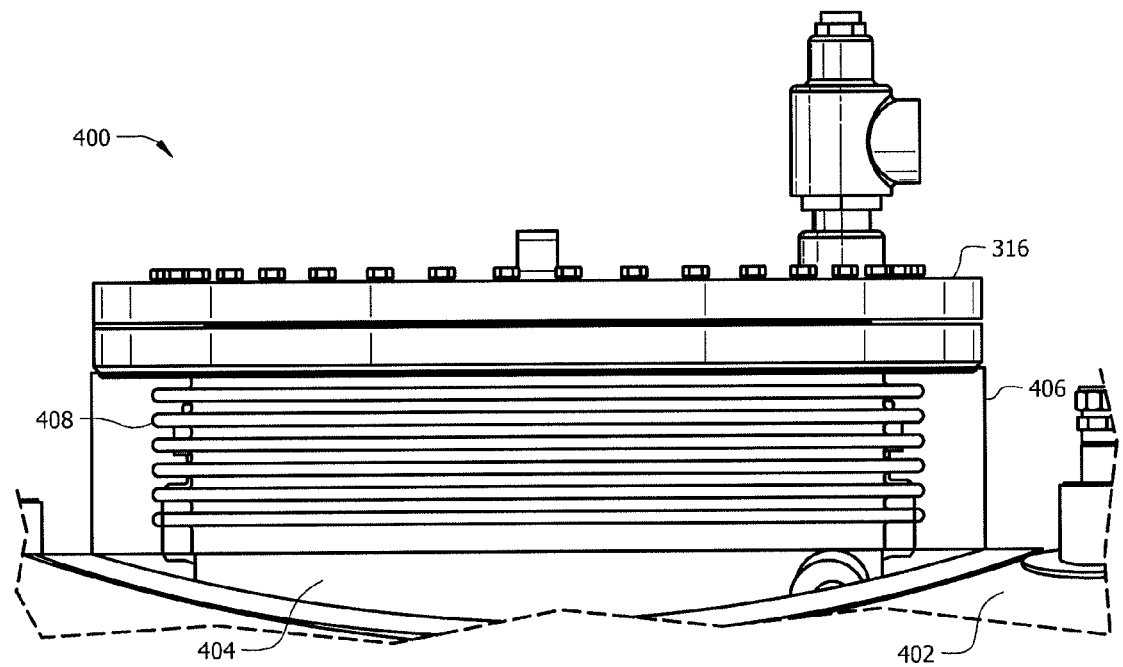
FIG. 10A illustrates a partially-transparent side view of an example bellows assembly of a system for storing cryogenic liquid in accordance with an embodiment of the present disclosure.
Figure 10B:
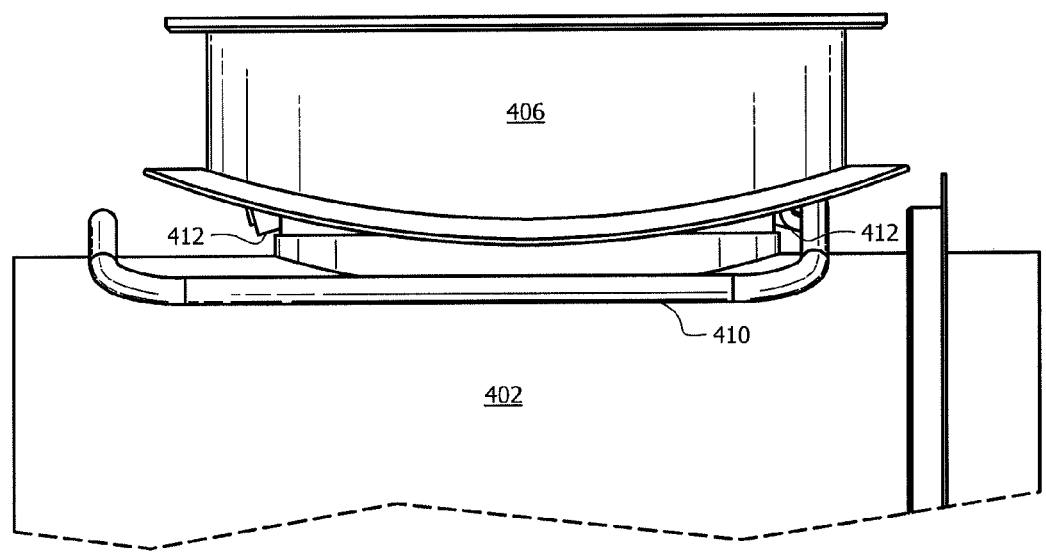
FIG. 10B illustrates a side view of an example outer manway of a storage tank in accordance with an embodiment of the present disclosure.

FIGS. 10A through 10B illustrate a partially-transparent side view of an example bellows assembly of a system for storing cryogenic liquid and a side view of an example outer manway of a storage tank, respectively, in accordance with an embodiment of the present disclosure. A system 400 may include a storage tank 402 configured to store cryogenic liquid. Storage tank 402 may include an inner vessel 404 and outer manway 406. Storage tank 402 may be substantially similar to storage tank 110 (of FIG. 1) and storage tank 302 (of FIG. 5).

Inner vessel 404 may refer to an inner wall of storage tank 302 and may include a vertical cylindrical base welded to the opening in the inner vessel and to which a bellows assembly 408 is welded to the opposite end. In certain embodiments, inner vessel 404 may extend through the vacuum space. Inner vessel 404 may include an inner manway lid (such as inner manway lid 312 of FIGS. 5-7) disposed over at least a portion of an inner manway (such as an inner portion of manway 310 of FIG. 5). In general, a bellows assembly 408 may be coupled to inner manway lid 312 of inner vessel 404. For example, bellows assembly 408 may be welded to the outside of the outboard of inner manway lid 312.

In certain embodiments, an outer manway lid (such as outer manway lid 316 of outer manway assembly 308 of FIG. 5) may be coupled to an exterior wall of storage tank 402 at a location above bellows assembly 408. For example, outer manway lid 316 may be coupled to the top of outer manway 406 of storage tank 402. In such an example, outer manway 406 may refer to a void formed in a body of storage tank 402 (such as in an outer vessel of storage tank 402). Accordingly, bellows assembly 408 may be positioned within at least a portion of the void and outer manway lid 316 may be disposed over at least a portion of the void and bellows assembly 408.

In general, bellows assembly 408 is configured to withstand the maximum allowable working pressure (e.g., a pressure at which a primary relief valve on the inner vessel opens) of storage tank 402. In certain embodiments, bellows assembly 408 serves as a vacuum boundary for a vacuum space (e.g., outside of bellows assembly 408 and between bellows assembly 408 and outer manway 406). For example, an insulating vacuum may be contained on the space outside of bellows assembly 408 permitting the inner vessel of storage tank 402 to expand and contract in relation to the outer vessel of storage tank 402 as it is cooled down or as it warms up when empty. In certain embodiments, fiberglass and super insulation (e.g., one or more layers of aluminum foil and fiberglass spacer paper) may be installed inside and/or around bellows assembly 408 (e.g., inside the bellows area between inner manway lid 312 and outer manway lid 316). For example, super insulation may be wrapped around the entire inner vessel, and also wrapped around bellows assembly 408 in the vacuum space. Discs of super insulation also may be placed in the non-pressurized void between the two manway lids.

As illustrated in FIG. 10B, electrical conduit 410 may extend from an inner manway lid (such as inner manway lid 312) through the bellowed area beneath an outer manway lid (such as outer manway lid 316) and then out of outer manway 406 through an annulus 412. Bellows assembly 408 is generally located within outer manway 406. In certain embodiments, a flange on the inner manway opening ring may be larger in diameter to accommodate a larger than standard diameter bellows assembly 408, which may be installed around an inner manway lid and thus may require an even larger diameter outer manway lid. Further, a vacuum may be contained on the outside of bellows assembly 408 permitting the inner vessel of storage tank 402 to expand and contract in relation to the outer vessel of storage tank 402 as it is cooled down or as it warms up when empty.

Although particular examples of outer manway 406 and bellows assembly 408 have been described, the present disclosure contemplates any suitable outer manway 406 and bellows assembly 408 comprising any suitable components configured in any suitable manner, according to particular needs. Moreover, outer manway 406 (and any component thereof) and bellows assembly 408 (and any component thereof) may be separate from or integral to any component of FIGS. 1-10B.

Figure 11:
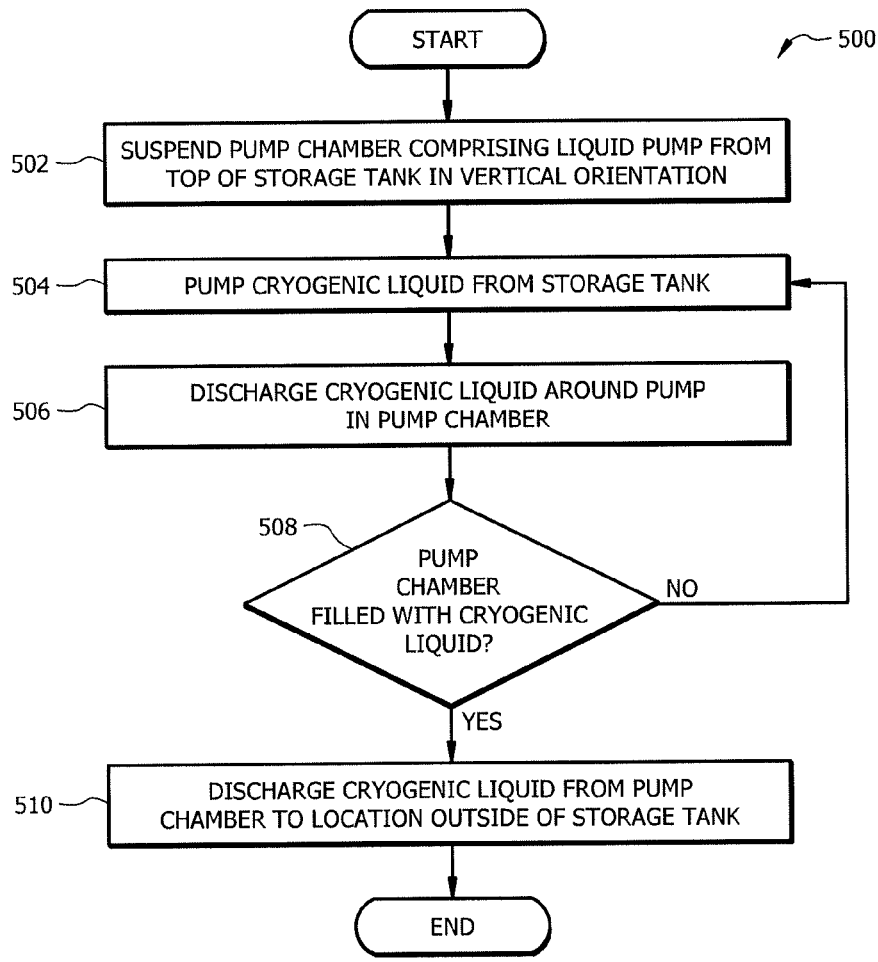
FIG. 11 illustrates an example method for a submerged pump in accordance with an embodiment of the present disclosure.

FIG. 11 illustrates an example method for a submerged pump in accordance with an embodiment of the present disclosure. Method 500 generally facilitates the installation, operation, and maintenance of a submerged pump (such as pump 130 positioned within pump chamber 120) of a cryogenic storage tank (such a storage tank 110). In certain embodiments, one or more steps of method 500 may be performed by system 100 of FIG. 1, system 300 of FIG. 5, and/or system 400 of FIGS. 10A-10B; however, the present disclosure contemplates any suitable combination of components of the present disclosure performing one or more steps of method 500.

The method begins at step 502 where a pump chamber, such as pump chamber 120 of pump assembly 112, may be suspended from a top of a storage tank, such as storage tank 110. Pump chamber 120 may house a liquid pump, such as pump 130, and may be suspended from the top of storage tank 110 in a vertical orientation (or any other orientation). In certain embodiments, pump 130 may be positioned within pump chamber 120 before pump chamber 120 is suspended from the top of storage tank 110 and/or installed in storage tank 110. Alignment guides, such as alignment guides 116, may facilitate positioning pump chamber 120 (and pump assembly 112) when lowered into inside of storage tank 110. The method also may use alignment guides 116 to secure pump chamber 120 (and pump assembly 112) within storage tank 110.

In certain embodiments, pump chamber 120 may be suspended from the top of storage tank 110 using a discharge pipe, such as discharge pipe 124, and/or an inner manway lid, such as inner manway lid 128. For example, a first end of discharge pipe 124 may be coupled to pump chamber 120 and a second end of discharge pipe 124 may be coupled to a bottom surface of inner manway lid 128. In such an example, inner manway lid 128 may be configured to couple to the top of storage tank 110, such as the top of an inner wall of storage tank 110. In certain embodiments, pump chamber 120 (and pump assembly 112) is installed within storage tank 110 using a crane operable to attach to a lifting eye 132 coupled to a top surface of inner manway lid 128.

At step 504, cryogenic liquid may be pumped from storage tank 110. For example, the method may use pump 130 to pump cryogenic liquid from storage tank 110. In certain embodiments, pump 130 utilizes suction nozzle 118 to draw cryogenic liquid from storage tank 110 into pump 130.

Cryogenic liquid drawn into pump 130 may be discharged around pump 130 at step 506. For example, cryogenic liquid drawn into pump 130 may be discharged out of discharge flange 136 and directed toward the sides of pump 130 by flow diverter 138. As such, the discharged cryogenic liquid spills down around pump 130 and quickly fills pump chamber 120 with cryogenic liquid to "submerge" pump 130, thereby cooling and lubricating pump 130. Pump chamber 120 may be filled and pump 130 submerged with cryogenic liquid within a few seconds of starting pump 130 (depending on the manufacturer, a pump 130 may run dry for a few seconds without being submerged).

At step 508, the method may determine whether pump chamber 120 is filled with cryogenic liquid. If it is determined that pump chamber 120 is not filled with cryogenic liquid, the method may move to step 504 (e.g., continue pumping cryogenic liquid from storage tank 110). Alternatively, the method may end. For example, step 508 may further include determining, in response to determining pump chamber 120 is not filled with cryogenic liquid, whether the level of cryogenic liquid in storage tank 110 is below a minimum threshold level (e.g., below a level for which pump 130 may catch prime from storage tank 110 during pumping operations). If the method determines that the level of cryogenic liquid in storage tank 110 is below the minimum threshold level, the method may end (e.g., rather than repeating steps 504-508).

Once it is determined that pump chamber 120 is filled with cryogenic liquid discharged around pump 130, the method may proceed to step 510 where the discharged cryogenic liquid in pump chamber 120 may be discharged out of storage tank 110 (e.g., to a location outside of storage tank 110) through a suspension pipe. For example, the discharged cryogenic liquid in pump chamber 120 may forced upward into discharge pipe 124 (e.g., through a pump chamber outlet) and then out a port in a manway lid (e.g., inner manway lid 128, inner manway lid 312, and/or outer manway lid 316) to exit storage tank 110.

After performing step 510, the method may end.

Some of the steps illustrated in FIG. 11 may be combined, modified, or deleted where appropriate, and additional steps may also be added to the flowchart. Additionally, steps may be performed in any suitable order without departing from the scope of the disclosure.

Figure 12:
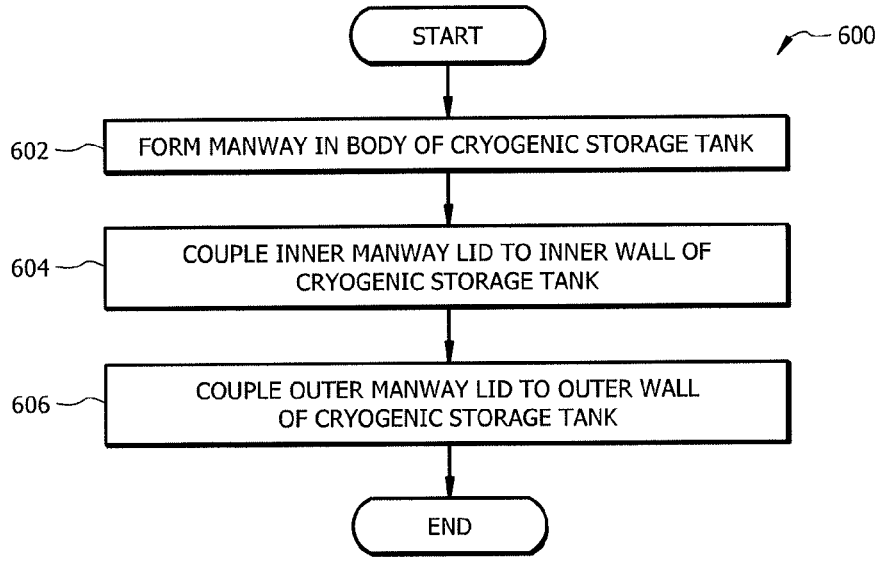
FIG. 12 illustrates an example method for a dual pressure-retaining manway assembly in accordance with an embodiment of the present disclosure.

FIG. 12 illustrates an example method for a dual pressure-retaining manway assembly in accordance with an embodiment of the present disclosure. Method 600 generally facilitates retaining pressure within a cryogenic storage tank (such as storage tank 110 of FIG. 1 and/or storage tank 302 of FIG. 5) and provides a secondary pressure barrier. In certain embodiments, one or more steps of method 600 may be performed by system 100 of FIG. 1, system 300 of FIG. 5, and/or system 400 of FIGS. 10A-10B; however, the present disclosure contemplates any suitable combination of components of the present disclosure performing one or more steps of method 600.

The method begins at step 602 where a manway, such as manway 310, may be formed in a body of a cryogenic storage tank, such as storage tank 302. Manway 310 may refer to an access opening located in an upper portion of storage tank 302 and may provide a service person or other personnel access to an interior of storage tank 302. In certain embodiments, at least a portion of manway 310 may be formed in an inner vessel of storage tank 302 and/or at least a portion of manway 310 may be formed in an outer vessel of storage tank 302.

At step 604, an inner manway lid, such as inner manway lid 312, may be coupled to an inner wall of storage tank 302 (e.g., an inner wall of an inner vessel of storage tank 302). In general, inner manway lid 312 is coupled to the inner wall of storage tank 302 such that inner manway lid 312 is disposed over at least of portion of manway 310. Inner manway lid 312 may be secured to the inner wall of storage tank 302 using bolts 314. In certain embodiments, shop air may be used to blow clean each bolt hole corresponding to each bolt 314 before inner manway lid 312 is bolted to storage tank 302. In certain embodiments, inner manway lid 312 is coupled to storage tank 302 with a gasket therebetween.

In certain embodiments, before coupling inner manway lid 312 to storage tank 302, a pump assembly 304 may be coupled to and suspended from inner manway assembly 306 (and inner manway lid 312) and may be lowered into storage tank 302 through manway 310. The method may perform this step using a crane attached to a lifting eye 332 of inner manway lid 312.

At step 606, an outer manway lid, such as outer manway lid 316, may be coupled to an outer wall of storage tank 302 (e.g., an outer wall of an outer vessel of storage tank 302). In general, outer manway lid 316 is coupled to the outer wall of storage tank 302 such that outer manway lid 316 is disposed over at least of portion of manway 310. Outer manway lid 316 may be secured to the outer wall of storage tank 302 using bolts 318. In certain embodiments, the method may use spring-loaded bolts (e.g., bolts 318) to secure outer manway lid 316 to storage tank 302. In such embodiments, outer manway lid 316 may open when pressure within storage tank 302 exceeds a threshold. In certain embodiments, shop air may be used to blow clean each bolt hole corresponding to each bolt 318 before outer manway lid 316 is bolted to storage tank 302. In certain embodiments, outer manway lid 316 is coupled to storage tank 302 with a gasket therebetween.

The method may further include coupling a relief valve and/or check valve to outer manway lid 316. For example, a relief valve 350 (e.g., a 2" by 2" safety relief valve) may be installed on a half coupling 352 (e.g., a 2" half coupling). In embodiments where a check valve is coupled to outer manway lid 316, a first end of a tubing line may be coupled to the check valve and a second end of the tubing line may be coupled to a gas detector. In such embodiments, the method may detect a leak within storage tank 302, alert the appropriate personnel of the leak, and/or safely halt all pumping operations.

Before performing step 606, a bellows assembly 408 may be installed around inner manway lid 312 of inner manway assembly 306. Bellows assembly 408 may accommodate thermal expansion and contraction of the inner vessel of storage tank 302 relative to the outer vessel of storage tank 302. Additionally, a vacuum jacket may be positioned between an inner wall of storage tank 302 and an outer wall of storage tank 302 (e.g., between inner manway lid 312 of inner manway assembly 306 and outer manway lid 316 of outer manway assembly 308), in certain embodiments. Moreover, cryogenic insulation may be installed between inner manway assembly 306 and outer manway assembly 308 (e.g., to block radiation from the sun). For example, a blanket of cryolite insulation and a blanket composed of super insulation (alternating layers of thin fiberglass spacer paper between lays of thin aluminum foil to block and reflect radiation) may be placed vertically around the circumference of a bellows assembly 408 and disks places horizontally in the bellow void area between the inner and outer manway lids. As another example, cryolite insulation may be used to wrap around both discharge flex hose 320 and electrical flex conduit 322 of inner manway assembly 306. In such an example, the method may use fiberglass tow (string) to loosely tie the cryolite insulation around the hoses. As a further example, a cryolite and super insulation disks may be installed underneath discharge flex hose 320, electrical flex conduit 322, and condolets 326 and 328. The disk may be cut radially to fit under discharge flex hose 320. As yet another example, cryolite disk insulation may be fitted on top of the insulated hoses, before installing super installation. In such an example, twenty-five layers of super insulation disks may be installed and put over the cryolite insulation disk. And two more disks of cryolite insulation may be fitted and installed on top of the super insulation.

In certain embodiments, after outer manway lid 316 is installed and/or positioned over at least a portion of manway 310.

After performing step 606, the method may end.

Some of the steps illustrated in FIG. 12 may be combined, modified, or deleted where appropriate, and additional steps may also be added to the flowchart. Additionally, steps may be performed in any suitable order without departing from the scope of the disclosure.

FIGS. 1-12 contemplate various advantages. Such advantages may include any suitable number and combination of the following: (1) a submerged pump chamber that may be quickly removed from the a storage tank and replaced and/or installed within the storage tank (possibly within a few hours, rather than days); (2) a submerged pump chamber that may be removed, installed, and/or replaced without requiring a service person to enter the confined space within a manway (e.g., the pump discharge flex hose and electrical flex connections may be easy to connect to and/or disconnect from the pump and, by suspending a pump assembly from an inner manway assembly (e.g., suspended from a pipe welded to the inside of an inner manway lid of the inner manway assembly), the pump assembly may lifted out and removed from a storage tank as part of an inner manway lid); (3) a pump located inside a storage tank that may be more thermally efficient than conventional pumps located outside of a storage tank in a sump and less expensive than a vacuum-jacketed sump; (4) eliminating the requirement of maintaining a minimum liquid level in the storage tank, which cannot be off-loaded, to keep the pump submerged (contrary to conventional pumping systems, the system described in the present disclosure may pump most of the cryogenic liquid from the storage tank and still submerge the pump to keep it cool inside the pump chamber, for example, whenever pumping operations begin and/or during pumping operations, until the tank is close to empty); (5) a secondary pressure withstanding outer manway lid of an outer manway assembly (in addition to an inner manway lid of an inner manway assembly that is configured to withstand pressure within a storage tank) that provides redundant back up to the inner primary manway lid seal of an inner manway assembly (the outer manway will prevent leakage even from a slight inner manway leak, which is especially important for flammable cryogens such as LNG, Ethylene, Hydrogen, Nitrous Oxide, or Ethane; under normal applications); (6) a redundant pressure retaining outer manway lid that may serve to minimize venting in the event of a catastrophic leak (i.e., a break in a discharge flex hose that is located on top of an inner manway lid) inside the manway between the inner and outer manway lids (in this case a pump submerged inside the inner vessel can pump liquid into the inner bellows area between the inner and outer manway lids for a brief period of time until the system shuts it off; as this liquid flashes from liquid to vapor and expands rapidly in volume, a relief valve on the outer lid will open to relieve excessive pressure, but will close again once the pressure drops below the setting of the relief valve, and the outer lid will continue to contain the pressure (this secondary pressuring retaining lid could prevent a scenario where the impoundment barriers around the site installation, for example, a flammable cryogenic liquid installation, i.e., an LNG fuel station, from otherwise being used to contain the liquid if it were to leave the tank, which would be considered a major incident)); and (7) a tell-tail sample gas line from the manway cavity, when ran and directed beneath a flammable gas detector and when used in flammable cryogenic service, may facilitate an automatic shut down of the system in the event of a leak and/or alarming and notifying an operator of a manway leak (which may otherwise go un-noticed, especially if the outer manway is secondarily containing an inner manway lid leak); and (8) a check valve coupled to a tell-tale gas line that may be configured allow any vapor or liquid to exit a storage tank and prevent any humid air from entering into an insulated area inside of a bellows assembly between the inner and outer manway lids.

Teachings of the present disclosure may be satisfactorily used to facilitate pumping cryogenic liquid from a storage tank and retaining pressure within a storage tank. Modifications, additions, or omissions may be made to the systems described herein without departing from the scope of the present disclosure. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Modifications, additions, or omissions may be made to the methods described herein without departing from the scope of the present disclosure. For example, the steps may be combined, modified, or deleted where appropriate, and additional steps may be added. Additionally, the steps may be performed in any suitable order without departing from the scope of the present disclosure.

Although embodiments of the present disclosure and their advantages have been described in detail, it should be understood that various changes, substitutions and alternations can be made herein without departing from the spirit and scope of the present disclosure as defined by the following claims. Moreover, although particular embodiments have been described herein, a myriad of changes, variations, alterations, transformations, substitutions, and modifications may be suggested to one skilled in the art, and it is intended that the present disclosure encompass such changes, variations, alterations, transformations, substitutions, and modifications as fall within the scope of the appended claims. For example, although particular embodiments of the disclosure have been described with reference to a number of elements included in a storage tank, these elements may be combined, rearranged or positioned in order to accommodate particular storage requirements or needs. Various embodiments contemplate great flexibility in the storage tank and its components. Additionally, while some embodiments are described with respect to a cryogenic storage tank, particular embodiments may be used for any type of storage tank.

What is claimed is:

1. A cryogenic storage tank comprising:
    a manway formed in a body of the cryogenic storage tank;
    an inner manway lid coupled to an inner wall of the cryogenic storage tank and disposed over at least a portion of the manway;
    an outer manway lid coupled to an outer wall of the cryogenic storage tank by a plurality of spring-loaded bolts and disposed over at least a portion of the manway;
    wherein the inner and outer manway lids retain pressure within the cryogenic storage tank; and
    wherein the plurality of spring-loaded bolts are configured to:
        open the outer manway lid when pressure within the cryogenic storage tank exceeds a threshold; and
        close the outer manway lid when pressure within the cryogenic storage tank drops below the threshold.

2. The cryogenic storage tank of claim 1, further comprising a bellows assembly, the bellows assembly installed around the inner manway lid.

3. The cryogenic storage tank of claim 1, further comprising a vacuum jacket, the vacuum jacket positioned between the inner wall of the cryogenic storage tank and the outer wall of the cryogenic storage tank.

4. The cryogenic storage tank of claim 1, further comprising a relief valve coupled to the outer manway lid.

5. The cryogenic storage tank of claim 4, wherein the relief valve is configured to open when pressure within the cryogenic storage tank exceeds a threshold.

6. The cryogenic storage tank of claim 1, further comprising a check valve coupled to the outer manway lid.

7. The cryogenic storage tank of claim 6, further comprising:
    a tubing line, a first end of the tubing line coupled to the check valve; and
    a gas detector coupled to a second end of the tubing line.

8. The cryogenic storage tank of claim 1, further comprising a purge valve coupled to the inner manway lid.

9. The cryogenic storage tank of claim 1, wherein the inner manway lid is coupled to a pump assembly of the cryogenic storage tank.

10. The cryogenic storage tank of claim 9, wherein the pump assembly is suspended vertically from a bottom surface of the inner manway lid.

* * * * *